US008997009B2

(12) United States Patent
Bechtel

(10) Patent No.: US 8,997,009 B2
(45) Date of Patent: Mar. 31, 2015

(54) INTERACTIVE COMPUTING SYSTEM WITH PERSISTENT THEMES

(76) Inventor: Paul L. Bechtel, Austin, TX (US)

( * ) Notice: Subject to any disclaimer, the term of this patent is extended or adjusted under 35 U.S.C. 154(b) by 648 days.

(21) Appl. No.: 13/210,361

(22) Filed: Aug. 15, 2011

(65) Prior Publication Data

US 2012/0064973 A1 Mar. 15, 2012

Related U.S. Application Data

(60) Provisional application No. 61/373,360, filed on Aug. 13, 2010.

(51) Int. Cl.
| | |
|---|---|
| G06F 3/00 | (2006.01) |
| G06F 3/039 | (2013.01) |
| A63F 13/98 | (2014.01) |
| G06F 3/01 | (2006.01) |
| G06F 3/0354 | (2013.01) |
| G06F 3/038 | (2013.01) |

(52) U.S. Cl.
CPC ............... *G06F 3/039* (2013.01); *A63F 13/02* (2013.01); *G06F 3/016* (2013.01); *G06F 3/03543* (2013.01); *G06F 3/038* (2013.01); *G06F 3/0395* (2013.01); *A63F 2300/1062* (2013.01); *A63F 2300/8094* (2013.01)
USPC ............................................. 715/764; 463/37

(58) Field of Classification Search
USPC ........................................... 715/764; 463/37
See application file for complete search history.

(56) References Cited

U.S. PATENT DOCUMENTS

| 6,597,342 | B1 * | 7/2003 | Haruta ........................ 345/157 |
|---|---|---|---|
| 2003/0006965 | A1 * | 1/2003 | Bohn ........................... 345/163 |
| 2003/0076357 | A1 * | 4/2003 | Glaser .......................... 345/765 |
| 2004/0119691 | A1 * | 6/2004 | Chang .......................... 345/163 |
| 2005/0151702 | A1 * | 7/2005 | Kirkland et al. ............... 345/1.1 |
| 2005/0280633 | A1 * | 12/2005 | Glaser .......................... 345/163 |
| 2006/0031752 | A1 * | 2/2006 | Surloff et al. .............. 715/501.1 |
| 2006/0250364 | A1 * | 11/2006 | Gorbunov ..................... 345/163 |
| 2006/0274042 | A1 * | 12/2006 | Krah et al. .................... 345/163 |
| 2008/0007527 | A1 * | 1/2008 | Sim et al. ...................... 345/163 |
| 2008/0120578 | A1 * | 5/2008 | Wang et al. ................... 715/867 |
| 2009/0045706 | A1 * | 2/2009 | Levitt et al. ................ 312/223.3 |
| 2009/0167685 | A1 * | 7/2009 | Wrubel et al. ................ 345/163 |

(Continued)

FOREIGN PATENT DOCUMENTS

WO WO 2010008866 A2 * 1/2010

*Primary Examiner* — Tadeese Hailu
*Assistant Examiner* — Andrew Chung
(74) *Attorney, Agent, or Firm* — Yudell Isidore PLLC

(57) ABSTRACT

A computing system environment comprises an improved pointing device (IPD) coupled to a computer having a computer display with an interactive user interface (IUI), all having a persistent theme and/or motif. The persistent theme is one that is based on and/or correlates to the aesthetic design of the IPD, which can be one of a plurality of distinct shapes of an animal, insect, mascot, among others, that can be associated with a particular persistent theme. The determined persistent theme can be optionally extended to the surface pad on which the IPD rests and to the exterior casing/skin of the computer cover. When the IPD and computer are operating with a persistent theme, such as with the IUI operating as a screen saver, the Enhanced Selection Buttons (ESBs) of the IPD can be configured to manipulate visual and other aspects of the IUI, including controlling a character within the IUI.

29 Claims, 14 Drawing Sheets

(56) References Cited

U.S. PATENT DOCUMENTS

2009/0293198 A1* 12/2009 Fodge et al. ............... 5/653
2010/0127983 A1* 5/2010 Irani et al. ............... 345/163
2010/0141689 A1* 6/2010 Johnson .................. 345/690
2010/0214217 A1* 8/2010 Lin ........................ 345/163
2010/0245221 A1* 9/2010 Khan ...................... 345/87
2010/0315350 A1* 12/2010 Rene et al. ............... 345/173
2011/0193780 A1* 8/2011 Schaaf .................... 345/163
2011/0310030 A1* 12/2011 Mundt et al. ............. 345/173

* cited by examiner

INTERACTIVE COMPUTING SYSTEM WITH PERSISTENT THEMES

PRIORITY CLAIM

Benefit of priority under 35 U.S.C. §119(e) is claimed based on U.S. Provisional Application No. 61/373,360, entitled, "Computer Pointing Device with Enhanced Selection Buttons" filed on Aug. 13, 2010, which disclosure is incorporated herein by reference.

BACKGROUND

1. Technical Field

The present invention relates in general to electronic computing systems and in particular to an interactive computing system including an improved pointing device with enhanced selection buttons and an interactive utility providing a persistent theme.

2. Description of the Related Art

Software themes for an operating system (OS) are ubiquitous in today's data processing systems. However, a conventional OS theme typically has no emotional attachment to a user of the data processing system, and does not present a single user experience that can be applied to various hardware peripherals. That is, computers are often impersonal because the computers are manufactured for a large market. Thus, other than a trademark of the manufacturer (e.g., Apple, HP, Lenovo) and some basic design features of the exterior casing, computer systems are deliberately made non-descript to appeal to a wide cross section of potential purchasers/users. Whether desktop computer systems of laptops or other personal computing devices, the overall design when combined with the various accessories merely indicate the manufacturer of the device and provide a specific color of the exterior casing of the device.

Accessories, such as pointing devices, mouse pads, etc., that can be purchased with or separately from the computer systems typically have some greater level of design and can provide a range of different functional aspects within the generally expected set of functionality. Thus, a pointing device or mouse, as they are commonly called, can be of a number of different basic shapes and configured with two or three main selector buttons, and perhaps a few other affordances or design features. Notably, none of these design features are associated with the actual computer system to which the accessory may be ultimately utilized as the accessory is design for general usage with any one or the numerous different designs of computer systems. While the owner and/or user of the computer system can select specific accessories to purchase and utilize with the computer system, ultimately a user has little avenue for providing a consistent look and feel to the various components making up the extended data processing system.

Additionally, in a pointing device, one or more buttons provide input to an operating system (OS) or application running on an operating system of the connected data processing system. Each individual button of a conventional computer mouse may be bound to a different functionality in an OS or application. The functionality associates a press/selection of each button with performing a different action. Computer mice typically are shaped in an elongated ovular shape and provide no visual or audible or tactile feedback to a user, responsive to user actions performed with the mice. Additionally button presses on a conventional computer mouse are controlled solely by the Operating System or Application and are thus limited to the configuration of and functions supported by the specific software.

SUMMARY

Disclosed is an interactive computing system including computer accessories and executable software having persistent themes. The interactive computing system comprises a computer, which can be a desktop computer or a personal portable computer, such as a laptop, netbook, or iPad®. The interactive computing system also comprises an interactive utility that executes on the computer to provide a specific visual scene and/or graphical theme on the monitor (or display device) of the computer. The computer also comprises an associated improved pointing device (IPD) having enhanced selection buttons, which is design to provide a consistent look and feel that fits with the theme and/or scene displayed on the computer monitor. In one embodiment, the interactive computing system also comprises an associated operating and/or playing surface on which the IPD can be moved and which is designed with a same persistent theme and/or scene related to the specific design of the IPD and the theme and/or scene displayed on the computer monitor when the interactive utility is being executed. The persistent theme is determined and controlled via the pointing device, which, when connected to the computer causes the interactive utility to be executed to re-configure one or more display aspects of the monitor to set/create the particular theme/scene. The persistent theme that associated with the connected IPD is then extended to the computer and optionally to the surface on which the IPD is placed.

Also disclosed is an Improved Pointing Device (IPD). The IPD is shaped in the likeness of an animal, other creature, a mascot, or other theme-specific three dimensional object that becomes a focal point of the persistent theme of the interactive computing system. The IPD has a sensor embodied therein for detecting movement of the pointing device on a two or three dimensional plane. The IPD contains a plurality of Enhanced Selection Buttons for issuing a plurality of input commands to the computer that may be communicatively connected to the IPD, via wired or wireless connection. For wireless connection, the IPD includes a wireless transceiver. The IPD also features a number of contextual Enhanced Selection Buttons (ESBs). The ESBs comprise one or more of a primary button, a secondary button, and one or more tertiary buttons. In one embodiment, where the IPD may be shaped like an animal or other creature with eyes, one or more of the ESBs are represented by (and thus presented in the shape of) an eye. In particular, with these embodiments, the eyes of the IPD represent and/or are utilized as the primary functional (selection) buttons of the IPD, operating similar to the left clickable and right clickable buttons on a standard mouse that enable the main selection features of the mouse. In one embodiment, the eye(s) and/or ESBs may be illuminated or backlit to provide increased visibility and/or visual cues to a user of the IPD. The backlighting of any combination of the ESBs may be permanently illuminated, may be contextually illuminated based on a current operating mode of the Improved Pointing Device, or may be controlled or programmed via software, such as the interactive utility, executing on the computer. Each of the ESBs may also be configured to perform a set of enhanced actions responsive to a selection/depression of the ESB by a user. In one embodiment, the IPD can be equipped with a speaker for playing back sound clips responsive to user interaction of the ESBs or responsive to instructions received from the data processing system. As an example, the IPD can be shaped as a frog and the IPD can be configured to emit a croak (or croaking sound) in response to the computer entering into a hibernation or sleep mode or in response to the contextual screen saver activating on the computer display to show a lily pond themed habit for the frog.

The above summary contains simplifications, generalizations and omissions of detail and is not intended as a comprehensive description of the claimed subject matter but, rather, is intended to provide a brief overview of some of the functionality associated therewith. Other systems, methods, functionality, features and advantages of the claimed subject matter will be or will become apparent to one with skill in the art upon examination of the following figures and detailed written description.

BRIEF DESCRIPTION OF THE DRAWINGS

The following detailed description of an illustrative embodiment will best be understood when read in conjunction with the accompanying drawings, wherein.

DETAILED DESCRIPTION

Figure 1A:
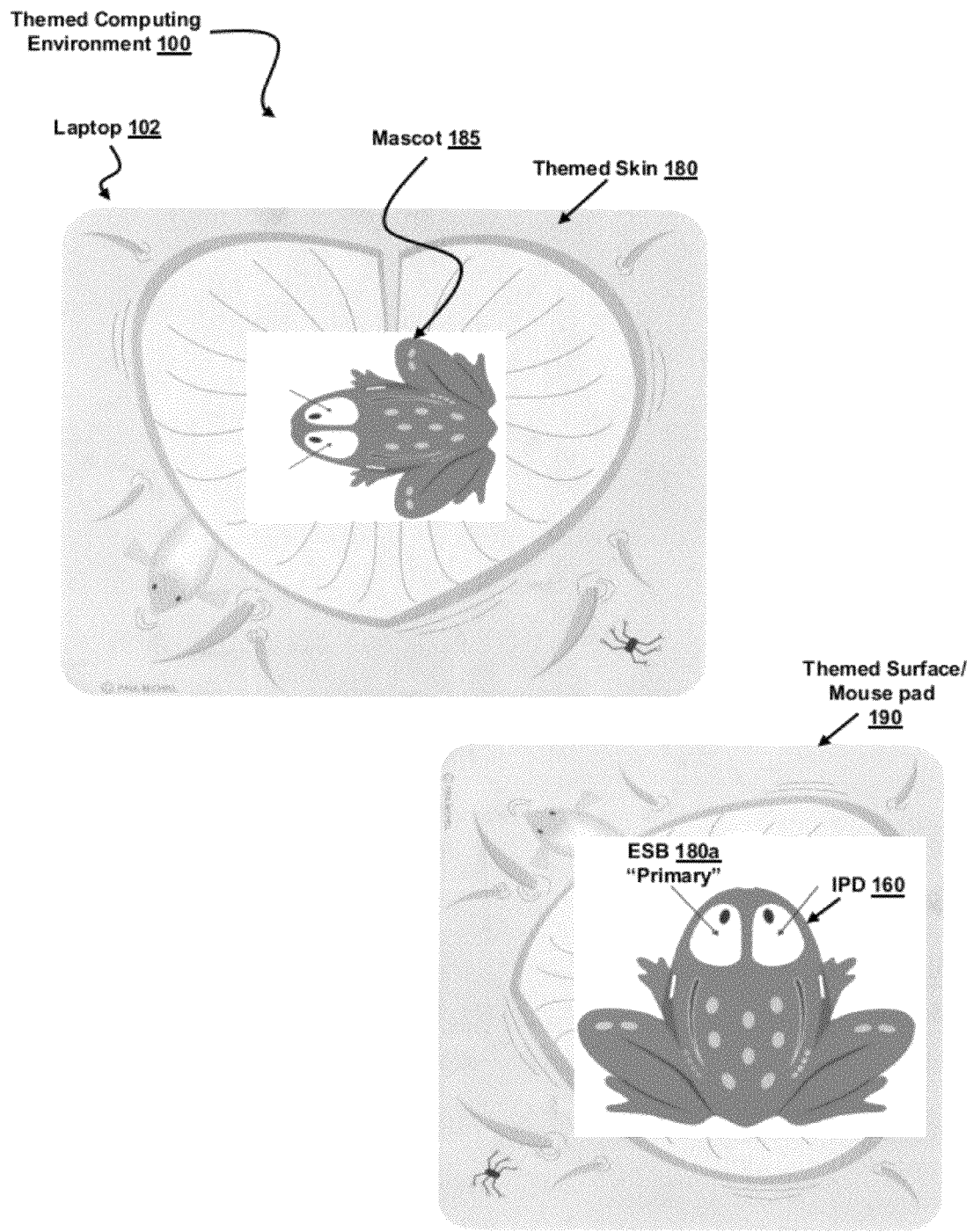
FIG. 1A depicts a high level block diagram illustrating components of an exemplary computer and an Improved Pointing Device (IPD) within an interactive data processing system, according to one or more embodiments.

The embodiments described herein provide a data processing system (DPS) environment having a persistent, visually distinctive theme across at least two and potentially all of a plurality of components including a computer, computer monitor display, a computer cover or skin, an interactive utility executing on the computer, an Improved Pointing Device (IPD), and a themed surface. Additionally, the embodiments provide an IPD configured in a three dimensional shape of an animal, other creature, a mascot, or other object, which provides distinct features that correlate to the presented theme of the data processing system environment. The IPD has a sensor embodied therein for detecting movement of the pointing device in a two/three dimensional plane and a plurality of Enhanced Selection Buttons (ESBs) for issuing a plurality of input commands and which provide sensory feedback to completion of specific ones of received input commands. The IPD also provides sensory feedback to the location of the IPD relative to the themed surface, certain aspects of the interactive utility executing on the computer, and/or other pre-programmed sensory feedback associated with operation of the IPD within the themed Computing environment.

In the following detailed description of exemplary embodiments of the invention, specific exemplary embodiments in which the invention may be practiced are described in sufficient detail to enable those skilled in the relevant technology to practice the invention, and it is to be understood that other embodiments may be used and that logical, architectural, programmatic, mechanical, electrical and other changes may be made without departing from the spirit or scope of the present invention. The following detailed description is, therefore, not to be taken in a limiting sense, and the scope of the present invention is defined only by the appended claims.

Features of the described embodiments can be realized in hardware or a combination of hardware, firmware and/or software. An example combination of hardware and firmware and/or software can be an application specific integrated circuit (ASIC) or other programmable module. Additional features of the described embodiment may be implemented within a general-purpose data processing system with a computer program/utility that, when loaded and executed, enables the physical pointing device to control operations of other program applications, the operating system and the computer system in general, such that the system performs one or more of the methods described herein.

Within the various embodiments described herein and illustrated by the figures, the persistent theme of the themed computing environment is presented as a swamp and/or a lily pond habitat inhabited by a frog. The frog represents the key character around which the theme is designed, as the IPD is designed in the shape of the frog. The frog is presented as a character within the interactive user interface as a controllable and movable part of the environment.

Figure 1B:
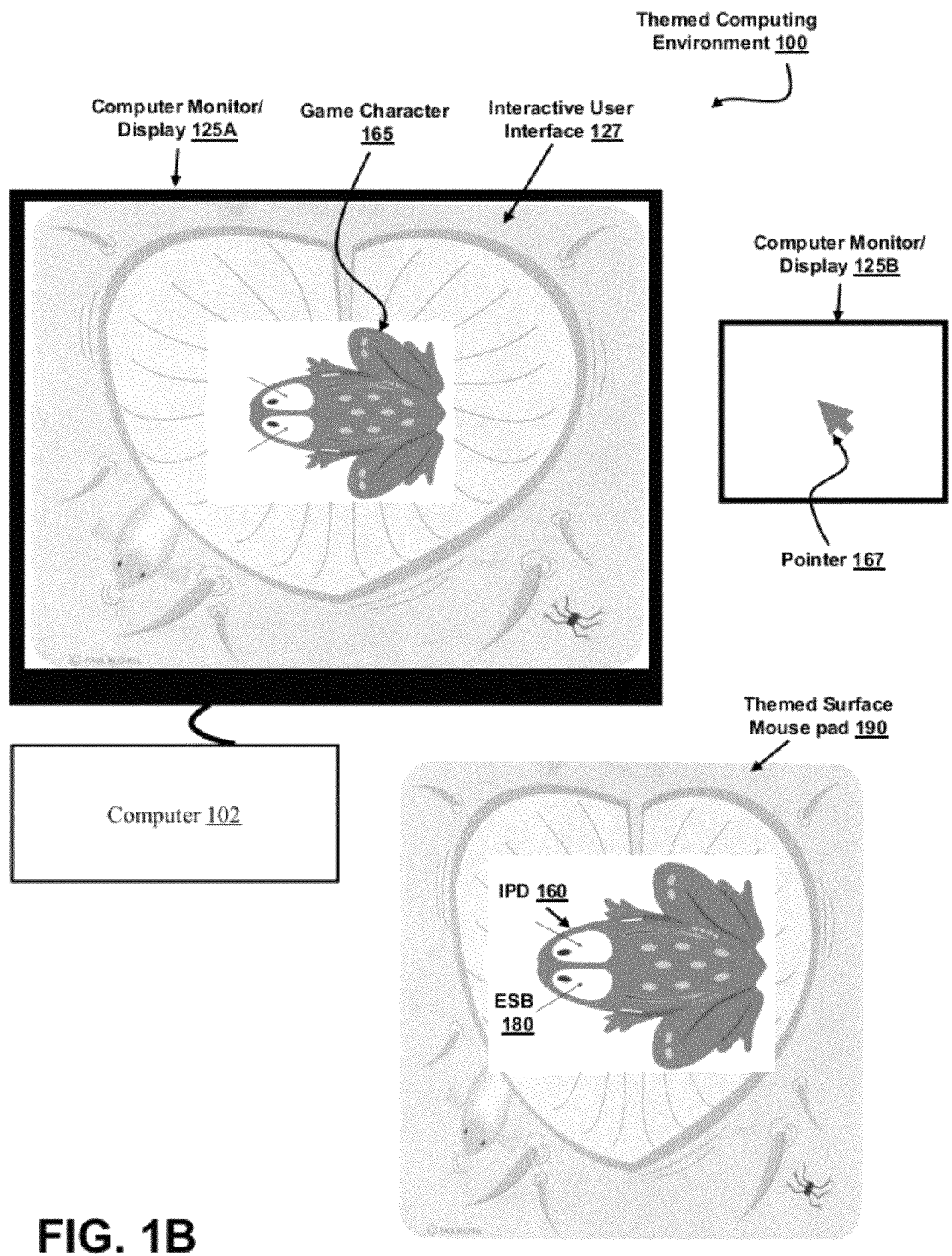
FIG. 1B is an illustration of an example interactive screen with a video graphic or image displayed on a computer monitor by execution of an interactive utility that provides a persistent theme with the connected IPD, according to one or more embodiments.

With reference now to FIGS. 1A and 1B, there are depicted two views of the individual physical components of an example themed data processing system environment 100. In FIG. 1A, themed computing environment 100 comprises laptop computer 102 having an external cover, themed skin 180, which is physically placed over the top surface of the laptop cover. The themed skin 180 provides a similar motif and/or look-and-feel as the other components of themed computing environment 100. In one or more embodiments, themed skin 180 is an off-the-shelf accessory that can be purchased separately from laptop computer 102 and placed over the outer casing of laptop computer 102. Different sizes of themed skin 180 can be provided to enable themed skin to fit over corresponding different sizes of computer devices. Also, different versions or types of themed skin 180 can be provided to enable use of themed skin to cover less than a complete surface area of the computing device. For example, one version of themed skin can cover just the exterior border or the outer edges of the device cover. Still another version of themed skin can be applied to the back portion of a device, such as an iPad® or other similarly constructed device, with a single functional/interactive surface backed by a backing surface.

Themed computing environment 100 also comprises an Improved Pointing Device (IPD) 160, which in the illustrative embodiments is shaped like a frog. IPD 180 is shown having eyes representing the ESBs 180 of the device. In the various described embodiments, where the IPD is shaped like an animal, insect or other creature having eyes, the eyes of the IPD represent and/or are utilized as the primary functional (selection) buttons of the IPD, operating similar to the left clickable and right clickable buttons on a standard mouse that enable the main selection features of the mouse. IPD 160 is physically located on top of a themed surface 190 which is a mouse pad that is designed with a similar theme or motif as the laptop skin and which, in the presented embodiment, provides the background habitat in which the frog "lives" and/or on which the frog moves. When placed adjacent to each other, the (computer's) themed skin 180, along with the themed surface 190, and corresponding IPD 160 presents a persistent look and feel, which as described below, can be directly correlated to the particular IPD that is being utilized with the computer. In one embodiment, the IPD 160, themed skin 180 and themed surface 190 are packaged together and sold as a set for use as/in a single computing environment.

FIG. 1B provides a different view of themed computing environment 101 having a display screen/monitor 125. In one embodiment, the display screen 125 represents a view of FIG. 1A, in which the laptop cover is opened, such that the themed skin 180 is now hidden on the opposing surface of the laptop cover. In another embodiment, the display screen 125 is a computer monitor that is connected to a computer (base) 102 housing the processing components of the computer device. In yet another embodiment, the display screen 125 can be a screen surface of a device such as an iPad®, which can be placed upright with some type of supporting arm or other supporting structure. As shown, the display monitor 125 presents an interactive user interface 127 that is generated by the execution of an interactive utility that generates features which correspond to and/or correlates at some level with IPD 190 and/or with the theme being presented by themed computing environment 101. Interactive utility executes on the computer 102 and generates the lily pond habitat on the display screen 125A, correlated to the frog design/shape of the connected IPD 160.

Within the interactive user interface 127, a graphical representation of the IPD shape (i.e., the frog) is provided as a movable component that can be manipulated via movement of the IPD 160 and/or selection of one or more of the ESBs 180 of the IPD 160. In the illustrative embodiment, the movable component is presented as a game character 165 and the themed interactive user interface 127 can be a game that involves the movement and/or manipulation of the game character 165.

Also illustrated by FIG. 1B is a second example of computer screen/monitor (shown as computer display 125B) when the interactive utility is turned off or is not currently active. In this scenario, the IPD 150 can provide basic pointing device functionality, by presenting a pointer 167 on screen within the display 125B. Thus, when the computer is not being utilized in themed game mode and/or when the computer is not in screen saver mode, the standard pointing device features are provided by IPD and reflected via the arrowed (or other) pointer 167 representing the pointing device on the display screen 125B.

Figure 1C:
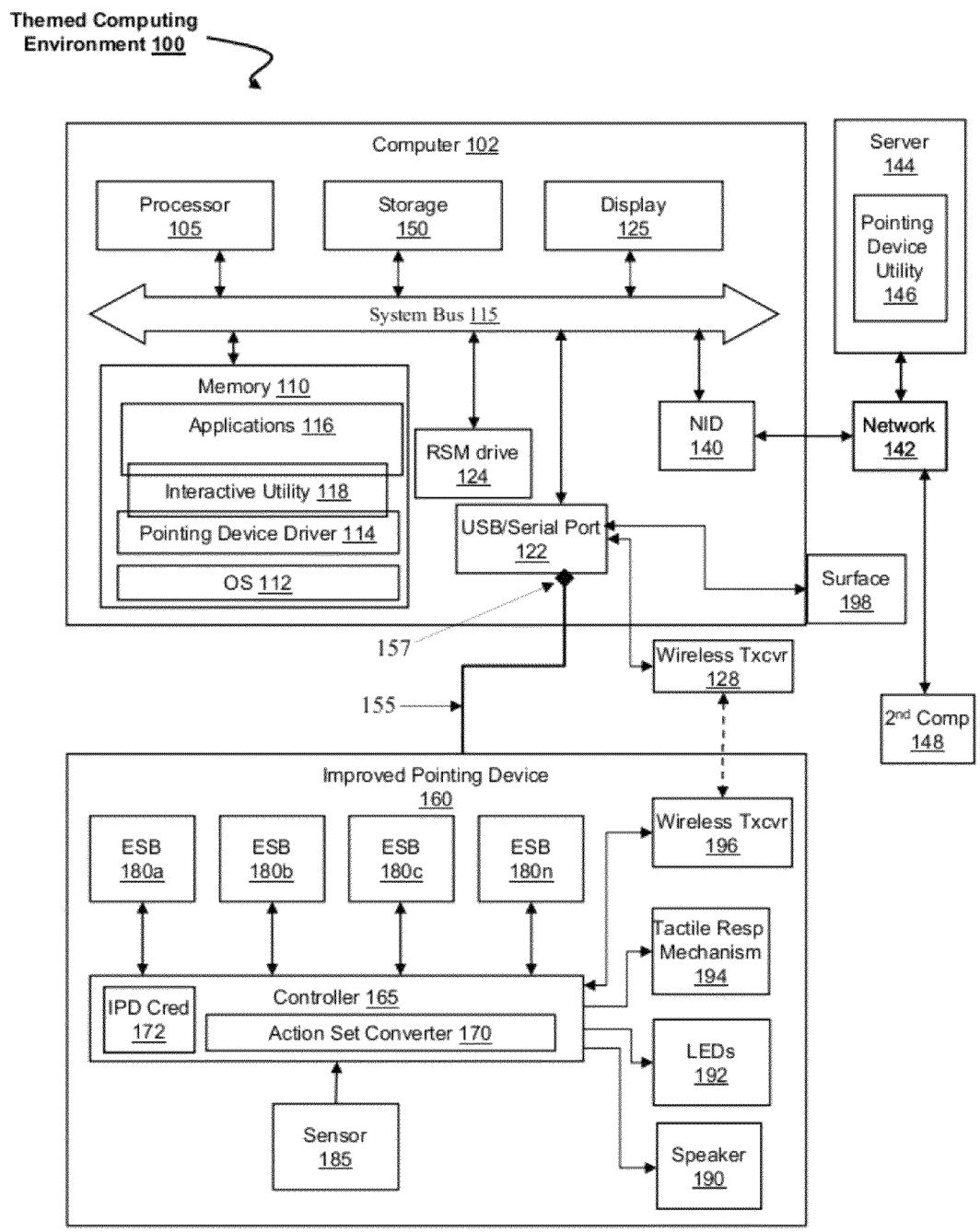
FIG. 1C is an illustration of a themed surface for use with an IPD, according to one or more embodiments.

FIG. 1C is a high level block diagram illustrating internal components of an example computer 102 and a connected Improved Pointing Device (IPD) 160 within exemplary themed computing environment 100, according to one or more embodiments. IPD 160 comprises controller 165, to which is coupled a plurality additional components, including Enhanced Selection Buttons (ESBs) 180*a-n* and sensor 185 According to the described embodiments, ESBs 180*a-n* comprise internal electronics and external physical affordances that may be depressed, rotated, selected and/or moved by a user of IPD 160. Controller 165 receives user input via ESBs 180*a-n* and sensor 185 (which is described in more detail below). Controller 165 also comprises action set converter 170 which is firmware that enables controller 170 to detect and correctly respond to movement of IPD 160, depression, selection, or manipulation of any one of the ESBs 180, or receipt of specific inputs that causes IPD 160 to provide a responsive output. Also, controller 165 comprises IPD identifying credentials 172 that includes information that the controller 165 transits to the computer 102 during one or more initial connections of the IPD 160 to the computer 102. The IPD identifying credential 172 can be utilized by the interactive utility 118 or the device driver 114 to determine both the type of IPD as well as which themed environment of multiple available and/or supported theme environments the particular IPD is intended to be utilized within. The IPD 160 can be utilized within the selected themed environment whenever the computer system 102 is in or enters into a themed mode of operation, e.g., when in an interactive screen-saver mode.

IPD 160 also comprises one or more of a plurality of input/output (I/O) devices, of which speaker 190, light emitting diodes (LEDs) 192, and tactile response mechanism 194, are illustrated. Each I/O device is coupled to controller 165. In one embodiment, IPD 160 provides responses to one or more user selections of one or more of the ESBs 180*a-n* and/or to completion of one or more functions occurring within an application or OS on the connected DPS 100. These responses can be visually indicated on IPD 160, such as via LEDs 192, audibly communicated via speaker 190, and/or sensed by the user via tactile response mechanism 194 (e.g., as a vibration of internal parts of IPD 160). The responses can be generated in response to an action or function performed using IPD 160 or in response to a change or function occurring within the computer 102 and/or the software currently executing within the computer 102. As an example, the responses can be triggered as a part of the interactive user interface. As a more specific example, the IPD 160, configured as a frog, can emit a croak in response to the game character 165 (FIG. 1B) within the interactive user interface 127 landing on the lily plant or moving off the lily plant into the pond or catching a fly presented within the interactive user interface 127. As another specific example, the eyes of IPD 160 can emit a light or blink just before the device enters into hibernation mode to alert the user that the device is about to go to a low power mode that will require a resume operation.

IPD 160 may be a wired or wireless device, depending on the specific design. Thus, to facilitate wireless operations of IPD 160, IPD comprises wireless transceiver 196, which is also coupled to controller 165. In one embodiment, DPS 100 and IPD 160 may communicate via one or more common wireless technologies (e.g., Radio Frequency (RF), Bluetooth®, or Wi-Fi). In another embodiment, IPD 160 communicates with DPS 100 via a wired connection 155 having a connector 157 (such as Universal Serial Bus (USB) connector) connected to/inserted into one of the I/O ports (122) of the computer 102.

Sensor 185 provides positional location tracking and movement tracking for IPD 160 and continually transmits any detected/sensed movement of the IPD 160 to DPS 100 via Wireless Transceiver 196 or wired connection 155. Movement of IPD 160 similarly moves a software pointer (167) viewable by a user on display 125 of computer 102. Sensor 185 may use any combination of one or more mechanical, optical, laser, or sensor arrays to track movement and positioning of IPD 160. In one embodiment, as illustrated by FIGS. 1A-1B, IPD 160 is positioned on a themed surface 190, and sensor 185 includes some mechanism for detecting when IPD 160 is physically located on top of themed surface 190 versus being located on a different surface, such as a regular mouse pad. Additionally, sensor 185 can also detect when IPD 160 is lifted off the themed surface 190 versus reaching and moving beyond one of the edges of the themed surface, and sensor 185 records such movement as a vertical movement of IPD 160. Thus, while the computer is displaying the interactive user interface 127, a detected vertical movement of the IPD 160 can be reflected as a vertical jump of the frog within the interactive user interface 127.

Referring specifically to computer 102, computer 102 comprises processor 105 that is coupled to memory 110 via System Bus 115. Processor(s) 105 may be a single processor, a multi-core processor, or a multi-processor array. System Bus 115 provides communication with various components of computer 102. As illustrated, computer 102 also includes storage 150, at least one I/O port illustrated as USB/Serial port 122, and network interface device (NID) 140, each of which is also coupled to System Bus 115. The format of the I/O ports connected to System Bus 115 may be any known to those skilled in the art of computer architecture, including but not limited to Universal Serial Bus (USB) ports. Also connected to System Bus 115 is a hardware based readable storage medium (drive) 124 within which can be inserted one or more removable storage media, such as, e.g., Compact Disk-Read Only Memory (CD-ROM), Digital video Disk (DVD), or flash drive memory. Storage 150 (and/or a removable storage media) can store data, instructions and/or program code for one or more applications, including an IPD driver and interactive utility, for example.

Computer 102 includes a number of input/output (I/O) devices coupled via one or more I/O controllers and bus fabric (not shown) to System Bus 115. Among the I/O devices are display 125 and IPD 160. Connection of IPD 160 to DPS 100 may be via wired connection or wireless connection, and DPS is equipped with both I/O ports (USB/Serial Port 122) to enable insertion/coupling of wired connection 155 and a wireless transceiver 128. Wireless transceiver 128 can be a peripheral component that is packaged and shipped with IPD 160 to enable wireless connectivity of IPD 160 to computer 102. Thus, wireless transceiver is illustrated ad connected via USB/Serial Port 122. Wireless transceiver 128 includes its own firmware to enable the wireless transceiver 128 to operate as a plug-and-play device. Similarly, in one embodiment, IPD 160 includes its own internally stored firmware/software that enables IPD 160 to be a plug-and-play device. A representative themed skin/surface 180 is illustrated that may also provide some functional connectivity to (in addition the aesthetic appearance of) computer 102. As an example, themed skin/surface 180 can include one or more LEDs and a connector to USB/Serial Port 122 and/or wireless transceiver 128 that enables themed skin/surface 180 to illuminate the exterior top surface of computer 102 responsive to one or more triggers.

NID 140 enables computer 102 to connect via an external network 142 to another computing device, such as server 144 or second computer 148. In one implementation, pointing device driver 114 and other pointing device utility 146 (which can include interactive utility 116), which are utilized by computer 102 to enable one or more of the functional features associated with the operation of IPD 160 can be located on a remote server (144) and can be downloaded via network 142 to a computer 102 during setup and/or configuration of IPD 160 or during subsequent upgrades to existing IPD drivers and/or supported utilities. In these embodiments, the download can be a dynamic feature that is programmed into the device driver (firmware) of the IPD 160. Modifications to existing IPD functionality (e.g., the different sounds played by IPD or the colors of the IPD's backlit ESBs) can also be downloaded from server 146 to provide updates to existing firmware or provide different firmware to computer 102. Also, in one embodiment, a version of an interactive utility can also be executed on second computer 148 to support an extension of the themed environment across multiple computing devices, as in a shared gaming environment.

In addition to the above described hardware components, computer 102 also comprises a number of software and/or firmware components. Thus, illustrated within memory 118 are example software, firmware and/or logic components, including operating system (OS) 112 (e.g., Microsoft Windows®, a trademark of Microsoft Corp, or GNU®/Linux®, registered trademarks of the Free Software Foundation and Linus Torvalds), IPD driver 114, and applications 116. OS 112 includes a shell, for providing transparent user access to resources such as applications 116. Generally, the shell is a program that provides an interpreter and an interface between the user and the operating system. In one embodiment, the shell may interpret commands received by IPD 160 and may send the interpreted command(s) to the appropriate lower levels of the operating system for processing. In other embodiments, the OS is enhanced with functional features of IPD driver 114, which enables the various feedback functions and other novel functions provided by IPD 160, in addition to basic operations of IPD 160 as a mouse or pointing device. Various features can be provided via execution by processor 105 of software or firmware code/logic stored in Memory 110 or other data storage (not directly illustrated).

Among the software provided is interactive utility 118, which is illustrated as being a software component within one or both of applications 116 and IPD driver 114. Depending on the manner in which interactive utility 118 is distributed to an end user, interactive utility 118 can be packaged as a sub-routing within IPD driver 114 or interactive utility 118 can also be provided as a separate application, purchased with or separate from IPD driver 114, as an enhancement to the usage of IPD 160 with computer 102. Interactive utility 118 may be installed on DPS 100 via RSM drive 124, transferred directly from IPD 160 or from wireless transceiver 128 upon connection of either device, or in another embodiment may be downloaded from server 144.

According to one embodiment, in response to detecting a connection of the IPD 160 to computer 102, the pointing device driver, IPD driver 114, and/or the OS 112 triggers the interactive utility 118 to execute on the computer's processor 105 and generate the interactive user interface 127 (FIG. 1B) with the game character 165 (FIG. 1B) identified therein. Alternatively, a manual triggering of the interactive utility 118 can be accomplished by associating a depression (by a user) of one or more of the ESBs 180 with the activation of the utility 118. In one or more embodiments, the interactive utility 118 can be stored in memory or provided via a connected storage device or streamed/downloaded from a remote server, such as server 144. The game character 165 will then be linked to the IPD 160, and any subsequent lateral, transverse and/or vertical movement (for a three dimensional application) of IPD 160 on themed surface (e.g., themed surface 190, which can be optionally required) causes the game character 165 to provide a similar movement (or an enhanced version of such movement) on the interactive user interface 127 (FIG. 1). By imitating the physical movements of the IPD 160 and representing those movements as the movement of the game character 165, the interactive utility 118 allows for enhanced user interaction within the presented theme and/or motif of the interactive user interface 127. Additionally, certain of these features of the game character 165 can be associated with specific interaction with one or more of the ESBs 180. Additional details are described in the below descriptions.

In one embodiment, driver 114 of computer 102 receives input from IPD 160 and responsive to such input issues commands or performs movements/actions of a pointer or a character, avatar, mascot, person, or animal that is displayed within interactive user interface 127 generated by execution of interactive utility 118, as viewed on display 125. In one embodiment, the interactive utility 118 is an interactive screensaver. In another embodiment, the interactive utility 118 is an interactive game, such as a videogame.

As described above, in one embodiment, themed surface 190 is a mouse pad. Themed surface 190 is constructed or coated in a material such as to improve gliding/sliding when IPD 160 is rested and/or operated thereon. In one embodiment, moving IPD 160 off the edge of themed surface 190 can cause IPD driver 114 to trigger issuing of one or more of an audible, tactile, or visual alerts to IPD 160, on IPD 160, or from IPD 160. IPD driver 114 can also trigger I/O devices of computer 102 to provide these responses as an extension of interactive utility 118. In one example, IPD driver can cause the lighting of one or more ESBS 180a-n or the playback of a frog croaking sound via speaker 190. Also, in another example, tactile alerts can also be presented to a user in the form of vibrational feedback of tactile response mechanism 194. The tactile alerts may also be issued as cues to IPD 160 from interactive utility 118 or may be created within controller 165 in response to sensor 185 detecting a specific action (such as moving IPD 160 off the edge of themed surface 190).

Referring again to FIG. 1C, controller 165 of IPD 160 comprises Action Set Converter 170 for converting single press inputs, double press inputs, rotational inputs, and other forms of inputs of one or more ESBs 180a-n into associated enhanced actions. ESBs 180a-n may transmit alternate enhanced actions to computer 102 (e.g., the user performing an actual double click). Releasing an ESB 180 following a depression of the associated external button/affordance may also perform an action or an enhanced action. One or more of ESBs 180a-n may also be an oversized ovular shape representative of and in the likeness of eyes (such as an insect, animal, fish, human, or other eyes). The primary and secondary ESBs 180a-b may also have a textured surface and/or be raised or elevated from the chassis of IPD 160 to provide maximum ease of use and tactile feel to a user. In the illustrative embodiments, and according to the ongoing example of a frog shaped IPD 160, the primary and secondary ESBs 180a-b are presented in the shape of the eyes of the frog. ESBs 180a-n may be mechanical buttons, or touch/pressure sensitive buttons, or capacitive buttons. In one embodiment, any combination of ESBs 180a-n may be backlit (with one or more LEDs 192 for example) to provide increased visibility and illumination of the buttons.

As introduced above, IPD 160 may be optionally equipped with Speaker 190. Speaker 190 may be internal to IPD 160 or may be flush mounted to chassis of the IPD 160. Speaker 190 is configured to play back sounds or sound clips. In one embodiment, in response to controller 165 detecting a click of one or more specific ESBs 180a-n, Controller 165 provides an electrical output representative of a specific one of the pre-stored sounds to Speaker 190. In one alternate embodiment, certain sounds (or electrical representations thereof) may be transmitted to the computer 102 for play back on the speaker system of the DPS 100. In such embodiments, the sound may be provided as a coded component or supported feature of the IPD driver 114 stored on computer 102.

In the presented embodiments, IPD 160, interactive user interface 127 presented by interactive utility 118, and themed surface 198 all have a same persistent theme. The persistent theme may be, for example, a habitat, a videogame, a motion picture, a television program, or specific aspects of an academic environment (such as a university/collegiate institution setting or high school mascot and sport team), a business, a uniquely definable corporate environment, a sports team, such as a professional sports team, and others. Other types of themes are also possible. Within the persistent theme, the actual design or IPD 160 may be specially constructed to fit within the selected theme. For example, when the theme is a swamp or a 111y pond, IPD 160 may be in the design of a frog, where two of the ESBs 180a-n, and particularly primary and secondary ESBs 180a-b, are provided by the eyes of the frog. In an alternate embodiment, IPD 160 is presented as a more general mouse shape, and is instead skinned with an overlay that adds the persistent theme. The overlay may simply be an aesthetic skin, or may be a "snap-on" component that changes the layout of ESBs 180a-n of IPD 160 in addition to the providing the aesthetic theme.

In the presented example illustrations, interactive user interface 127 is also presented on display 125 with a same theme as IPD 160 (e.g., a pond). Interactive utility 118 may display a scene or habitat appropriate for the persistent theme. For example, when the persistent theme is a swamp, the habitat may include one or more characters such as frogs, flies, alligators, crocodiles, or snakes that may enter or exit the viewable habitat randomly, or at a predetermined time. The habitat may also have illustrated therein one or more environmental items such as a body of water, a sky, lily pads, seaweed, swamp grass, and floating or bridging logs. The interactive utility 118 may also provide auditory feedback representative of the habitat setting such as ambient noises or sound effects appropriate to the habitat (such as crickets chirping, frogs croaking, etc). One or more of the characters may be controlled by a user of IPD 160, and/or via an artificial intelligence (A.I.) of interactive utility 118 that allows the various characters to all interact with each other. In one embodiment the frog(s) may eat the flies or be eaten by predators themselves (such as the alligators, crocodiles, or snakes). These actions may be dependent on a character interacting, or being in a specified proximity to other characters. Additionally, the body of water, the sky, the lily pads, and the floating or bridging logs may also react to interaction by a player-controlled character. Moving a player-character or a pointer off the edge of interactive utility 118 may also result in audible, tactile, or visual alerts on IPD 160 or via visual cues on interactive utility 118.

Themed surface 190 may feature a same or similarly themed habitat as interactive user interface 127 thus continuing the same persistent theme as IPD 160 and interactive user interface 118. In one embodiment, themed surface 198 is a traditional mouse pad that is designed with the persistent theme. In another embodiment, themed surface 198 may also have embodied therein a display that dynamically changes the displayed theme based on the persistent theme that is being presented by the interactive user interface. For example, when the selected persistent theme is a swamp or pond, surface 198 may display a lily pad. However, if the theme is changed to a business/corporate advertisement, such as ad advertisement for Coca Cola®, the IPD 160 can be in the shape of a coke bottle, the themed surface 190 and by extension the interactive user interface 127 may display the aspects of a coca cola advertisement complete with images of the product and illustrations of persons drinking the product.

While the persistent theme is illustrated as a swamp and/or pond theme in FIGS. 1A-1B, with related IPD in the shape of a frog in FIGS. 2A-5, it should also be noted that a large variety of persistent themes are possible. For example, the persistent theme could also be that of a collegiate university or high school where the interactive utility 118 presents a videogame in which a user of IPD 160 manipulates the mascot of the collegiate university via IPD 160 which is also designed in the likeness of the mascot of the collegiate university. In this example, interactive user interface 127 and themed surface 190 may be a scene from the school campus such as a football stadium or common area of the campus. In another embodiment, the persistent theme may be a motion picture, wherein the interactive utility is a screensaver showing characters and/or scenes from the film, the themed surface 190 displays a specific scene from the film, and IPD 160 is molded in the likeness of a (main) character of the film. In yet another embodiment, the persistent theme may be a political campaign of a politician, and the interactive utility presents a screensaver that displays pictures of the politician, with the theme of the home state of the politician, the themed surface 190 displays a flag of the home state of the politician, and IPD 160 is molded in the likeness (or exaggeration) of the politician or the politician's car.

In the described embodiments, the persistent theme is selected based on and/or correlated directly with the specific pointing device driver 114 installed on computer 102. In an alternate embodiment, the persistent theme is stored on the IPD 160 and the theme of interactive user interface 127 and that displayed of themed surface 190 can be dynamically changed to match the detected theme of IPD 160 when IPD 160 is initially connected to computer 100. This embodiment assumes that interactive utility 118 comprises multiple different coded modules representing different themes, where the modules can selectively be executed by the processor depending on which ones of a plurality of available IPDs 160 are currently connected to the computer 102. Likewise, aspects of the themed surface 190 can also be selectively modified based on the specific IPD 160 that is physically located on the themed surface 190.

In another embodiment, computer 102, display 125, and a keyboard (not pictured) connected to computer 102 are also constructed or skinned in the same persistent theme (and thus featuring like colors and shapes) as presented by the interactive utility 118, IPD 160, and/or themed surface 190. For example, when the theme is a swamp or pond and computer 102 is a laptop, the laptop may be constructed of a molded frog shape, or may be skinned or otherwise overlaid with physical components that present a frog or a swamp/pond scene to coincide with the persistent theme of interactive utility 118, IPD 160, and/or themed surface 190. In another example, display 125 may also feature an attachable overlay that affixes to the border of the display screen border to provide a same habitat motif as that provided by interactive utility 118, IPD 160, and/or surface 190.

The hardware, firmware, and/or software elements depicted in computer 102 and IPD 160 are not intended to be exhaustive, but rather represent and/or highlight certain components that may be utilized to practice the present invention. For example, different configurations of computer 102 as well as IPD 160 may be utilized containing other devices/components, which may be used in addition to or in place of the hardware and/or firmware depicted. The depicted example is not meant to imply architectural or other limitations with respect to the presently described embodiments and/or the general disclosure.

Figure 2A:
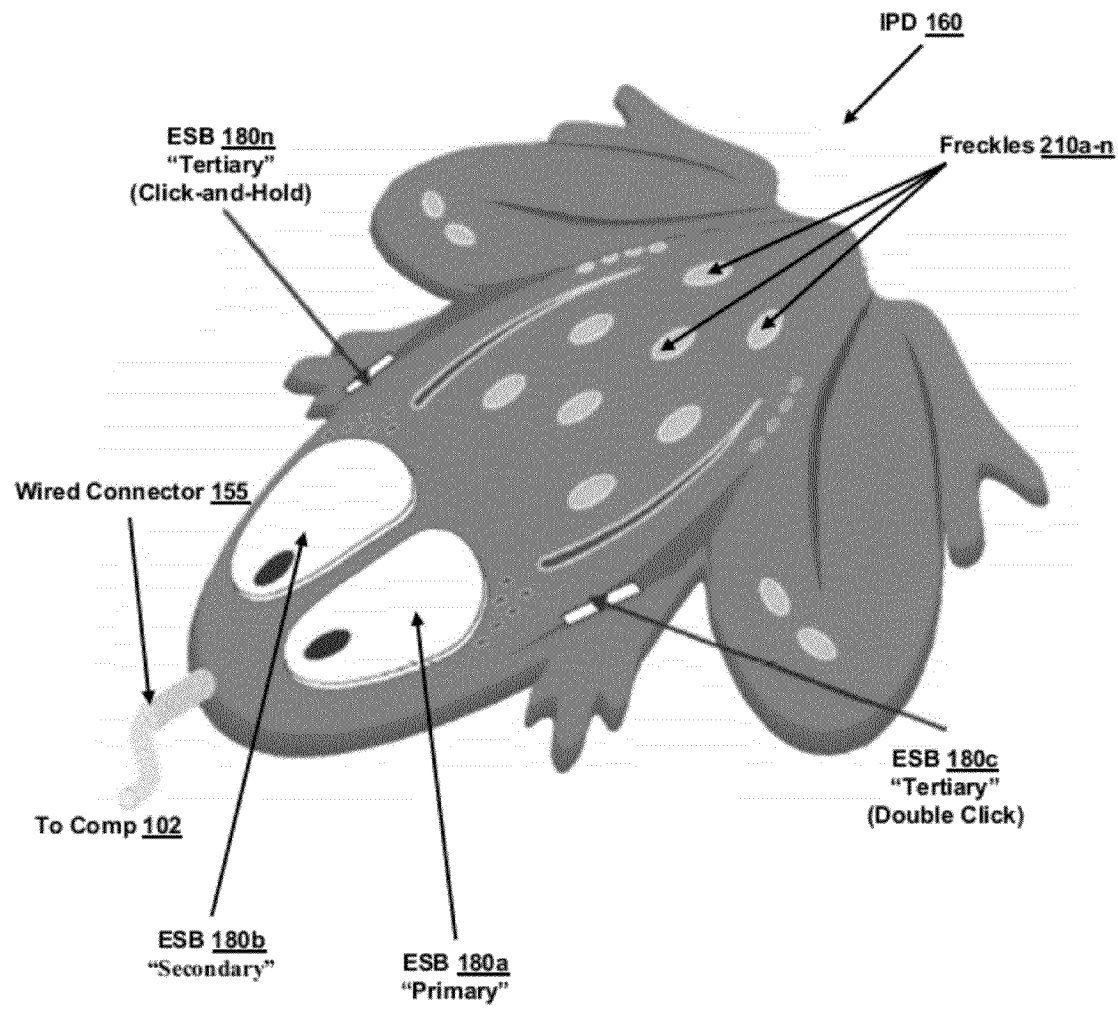
FIGS. 2A-2F illustrate different views of an IPD, designed as a frog, with wired and wireless connections, according to one or more embodiments.

With reference now to FIGS. 2A-2F, there are depicted multiple view of illustrations of the Improved Pointing Device (IPD) 160, which is designed in the likeness of a frog, according to one embodiment. Referring to FIG. 2A, IPD 160 is configured with four ESBs 180a-n: Primary ESB 180a, Secondary ESB 180b, and two Tertiary ESBs 180c-n. In the illustrative embodiment, two ESBs, primary and second ESBs 180a-b, are designated as primary and secondary buttons, respectively, while ESBs 180c-n are designated as tertiary buttons. Primary ESB 180a and Secondary ESB 180b may be configured to perform click selection functionality (such as left click and right click, respectively) for an Operating System (OS) 140 or Applications 145, executing on DPS 100. According to the embodiments, the eyes of the IPD represent and/or are utilized as the primary and secondary ESBs 180a-b of the IPD. Thus, clicking or double clicking the right eye or the left eye provides similar functionality as performing the same clicks with the left clickable and right clickable buttons on a standard mouse. According to one aspect of the described embodiments, one of the tertiary ESBs 180c-n can be utilized as a toggle button that allows the themed display on the IUI to be changed from a simple screen saver (setting the persistent theme with the IPD) to a fully interactive video game, and vice versa. When toggled to the video game mode, the IPD becomes a game controller with functionality extending beyond those available when the IUI is in a screen saver mode, where the IPD is merely a visual character within the visible themed environment, and has limited functional use or ability.

Figure 2B:
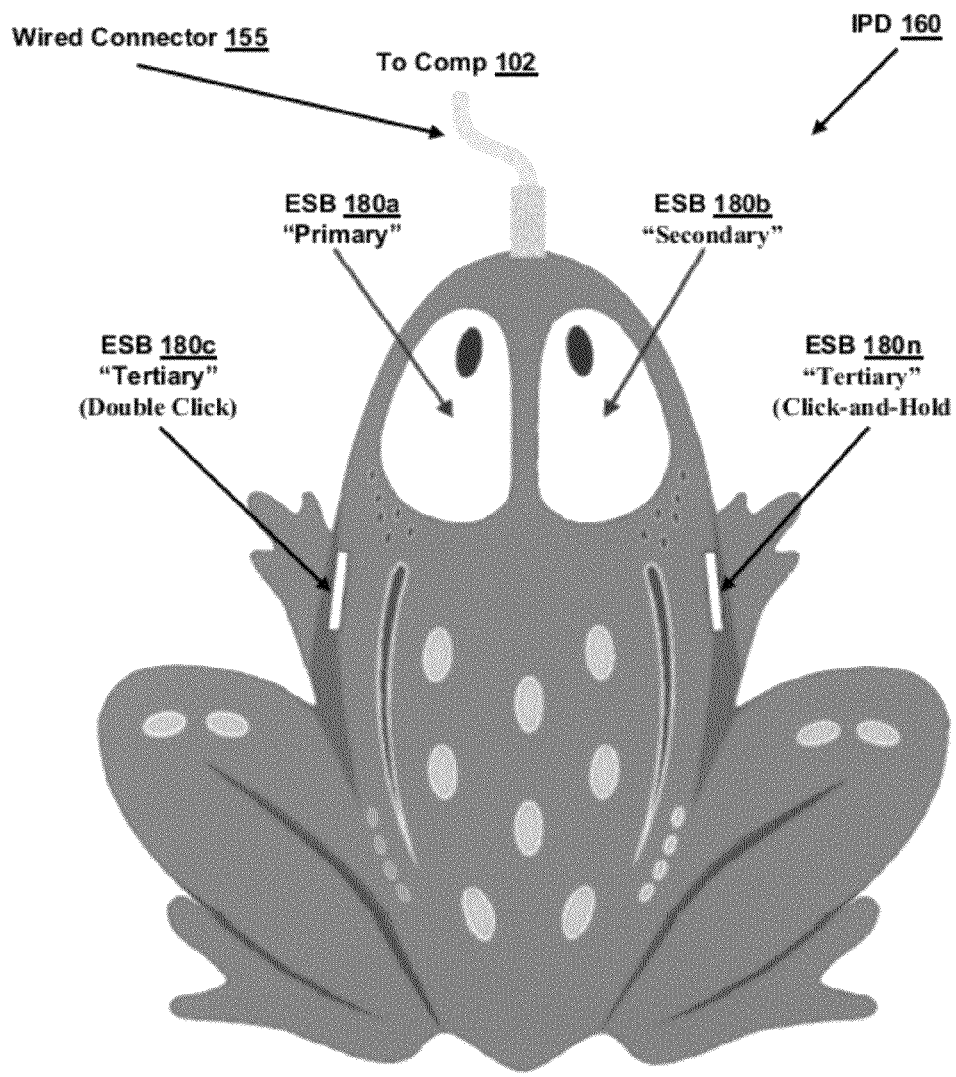
Figure 2C:
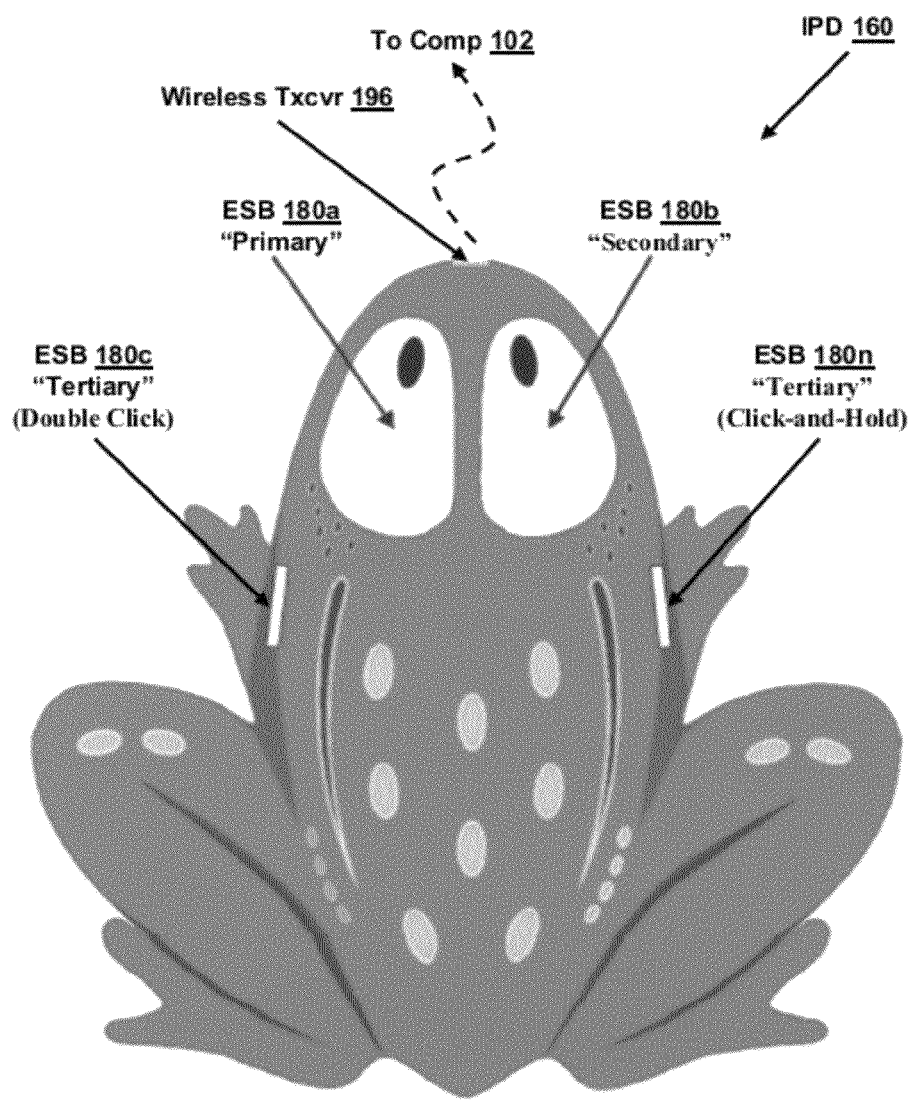
Figure 2D:
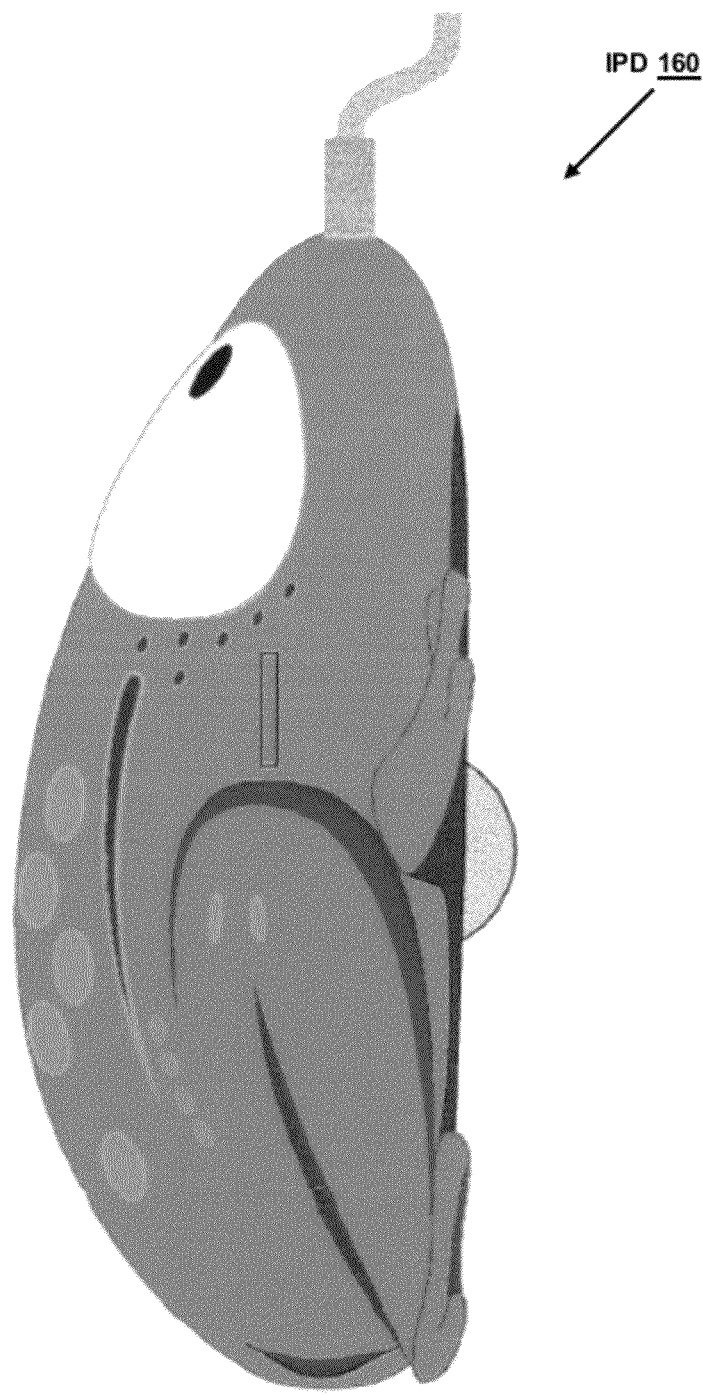
Figure 2E:
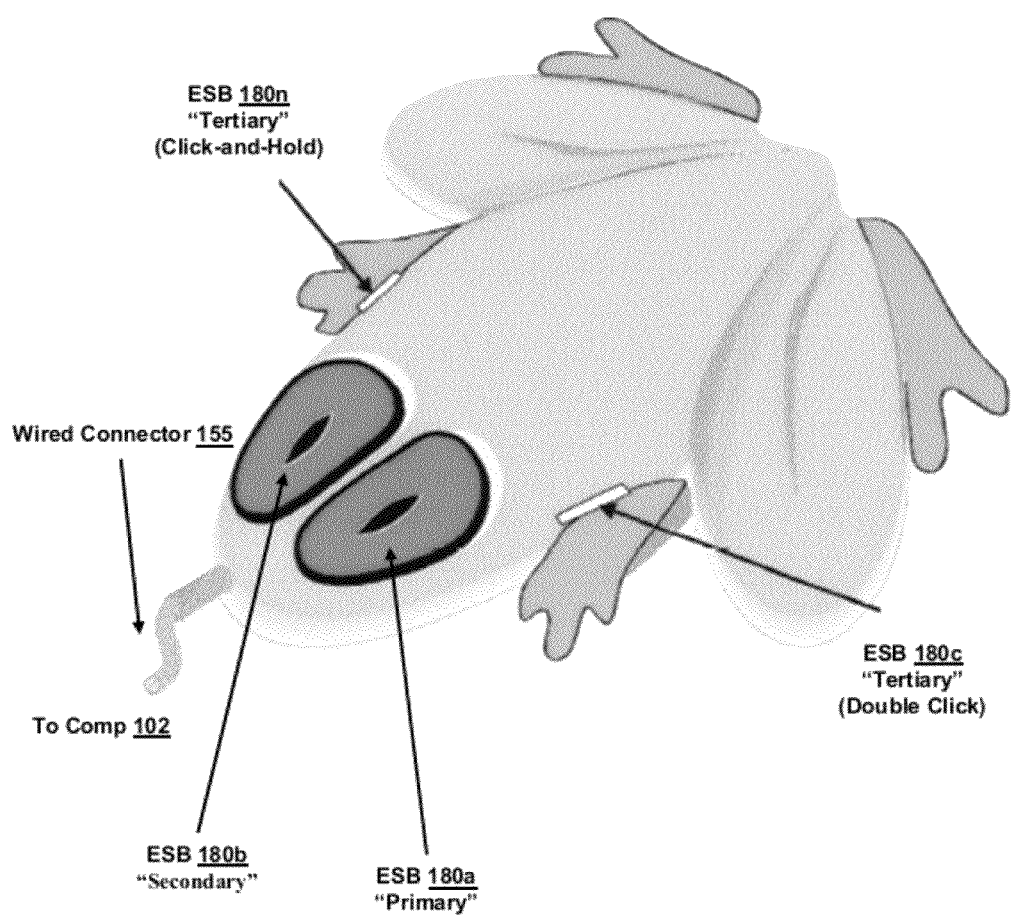
Figure 2F:
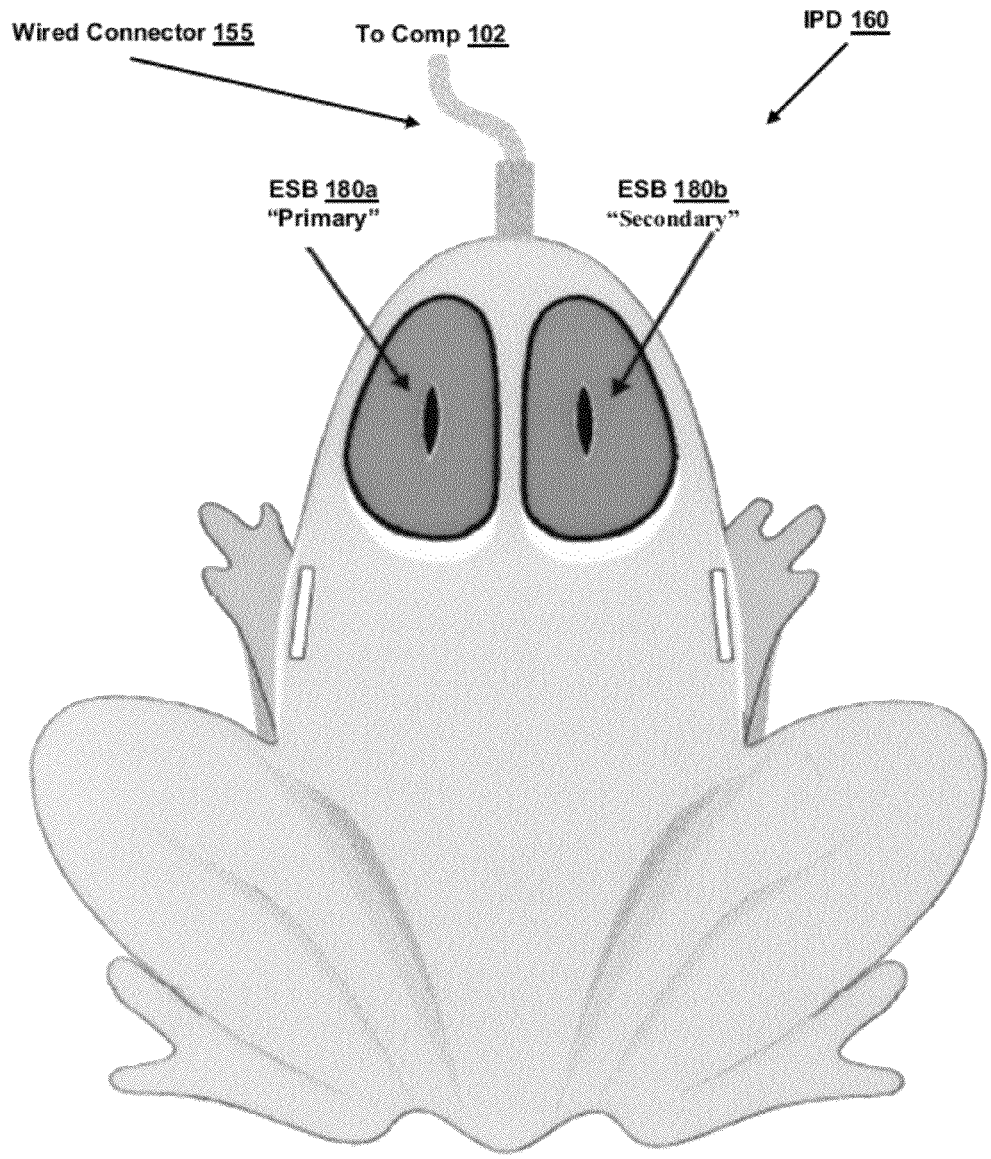

As shown, IPD 160 is connected to DPS 100 via wired connector (or cord/cable connector) 155. FIG. 2B provides a birds-eye view of IPD 160 with wired connection to computer 102, shown from a different angle, while FIG. 2C depicts a similar angle of IPD 160 as FIG. 2B, but with IPD 160 configured as a wireless device, having a wireless transceiver 196. FIG. 2D, depicts a right-side view of IPD 160, which illustrates an underside track ball, as one possible implementation of the mechanical aspect that facilitates movement that is tracked via the sensor component. As described above, however, sensor component can be any of a plurality of available mechanical, optical, laser, or sensor arrays that enable sensor component to track movement and positioning of IPD 160. Two additional examples include infrared sensors and Blue Track sensors (of Microsoft Corporation). FIGS. 2E and 2F illustrate similar views as FIGS. 2A and 2B, respectively, but with a different texture presented as the exterior skin/casing of the IPD 160.

Any one of ESBs 180a-n may be configured via converter 170 or via IPD driver 114 or applications 116 to perform enhanced actions for OS 140 or applications 145. The enhanced actions may comprise, but are not limited to, multiple button clicks (such as double, triple, or quadruple clicks), click-and-hold, or click-and-drag. Enhanced actions may be performed solely based on user button selection or based on a manufacturer's configuration of IPD 160 or based on a configuration provided via an application (e.g., Applications 145) executing on computer 102. In one embodiment, Tertiary ESB 180c is configured to perform the enhanced action of a double click when pressed a single time, while Tertiary ESB 180n is configured to perform the enhanced action of a click and hold when pressed a single time. Thus, in response to converter 170 detecting downward pressure on ESB 180c, a double click command is sent to DPS 100, while detection of a single depressing of ESB 180n results in a click-and-hold command being sent to DPS 100.

Additionally, any one of ESBs 180a-n may perform redundant functionality of another ESB 180a-n. Tertiary ESBs 180c-n may be configured to perform the same functions as ESB 180a and ESB 180b, respectively, or each of the ESBs 180a-n may be configured to all function as the same button (for example, each of ESBs 180a-n performs a left click operation, regardless of which specific ESB 180a-n is pressed). The programming of specific functions to specific one of the ESBs may be performed by the user of the IPD 160 utilizing the IPD driver 114, which stores the current assigned functions and deciphers each received input from IPD 160 to generate the correct resulting function. In one embodiment, one or more of the ESBs 180a-n may be configured to launch interactive utility 118. For example, in one embodiment, one of the tertiary ESBs 180c-n can be programmed to activate the interactive utility 118 and generate interactive user interface 127 on display 125. Detection of a depression of the preselected ESB triggers the execution of the interactive utility 118 to generate the interactive user interface 127.

ESBs 180a-n may be always illuminated (when connected to DPS 100), de-illuminated, unless illumination is specifically activated, or may be illuminated responsive to an action by a user (such as depressing a button linked/corresponding to the ESB), or may be illuminated based on contextual feedback from computer 102 (such as application 145 requiring a click input to continue processing). ESBs 180a-n may be illuminated and become de-illuminated while pressed, or may be normally de-illuminated and become illuminated only while pressed. Additionally, controller 165 may be preconfigured or configured by software to illuminate one or more ESBs 180a-n responsive to software cues or required inputs/selections by a user. Controller 165 can also illuminate or de-illuminate any of ESBs 180a-n after a set period of time, or after a predetermined period of time since a last action occurred (e.g., ESBs 180a de-illuminates 5 seconds after last being pressed). Furthermore, the chassis of IPD 160 may be constructed of a semi-transparent material to permit backlight illumination of the chassis of IPD 160 itself such that IPD 160 can glow in the dark. In still another embodiment, the chassis of IPD 160 may be constructed from a phosphorescent material.

IPD 160 may optionally have freckles 210a-n. In one embodiment, freckles 210a-n may serve aesthetic purposes such as having a raised surface or a difference in material or color. Alternatively, in alternate embodiments, freckles 210a-n can be open holes or holes covered with a sound permeating material (such as wire mesh) to allow sound to properly outlet from an internal speaker (e.g., speaker 190). Other functional usage of one or more of freckles 210a-n is also supported in alternate embodiments.

Speaker 190 may play sound clips responsive to user interaction with IPD 160 (such as playing a sound clip of a frog "croaking" responsive to depressing ESBs 180a-n). In one embodiment, applications 145 can be configured to provide additional playback sounds or sound clips to IPD 160 for storage on controller 165 and playable on speaker 190 independently or responsive to controller 165 detecting a click of one or more of ESBs 180a-n.

Figure 3:
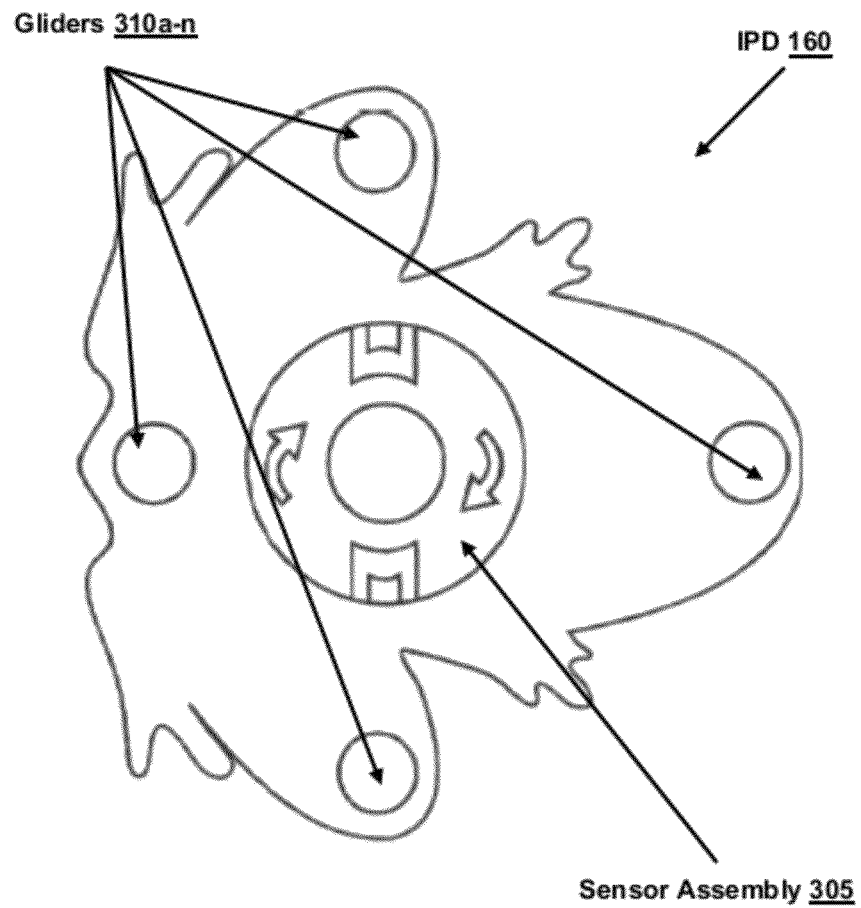
FIG. 3 is an illustration of the underside of the IPD of FIGS. 2A-2C, according to one or more embodiments.
Figure 4A:
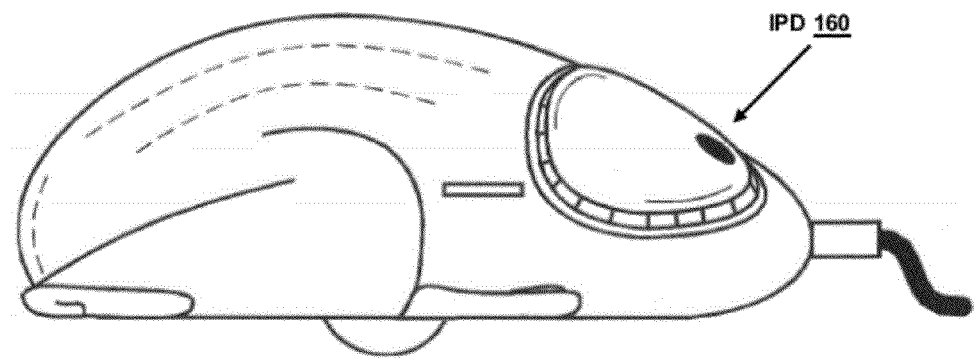
FIGS. 4A-4E and 5 are schematics of alternate views and/or orientations of the IPD of FIGS. 2A-2C depicted from multiple angles, according to one or more embodiments.
Figure 4B:
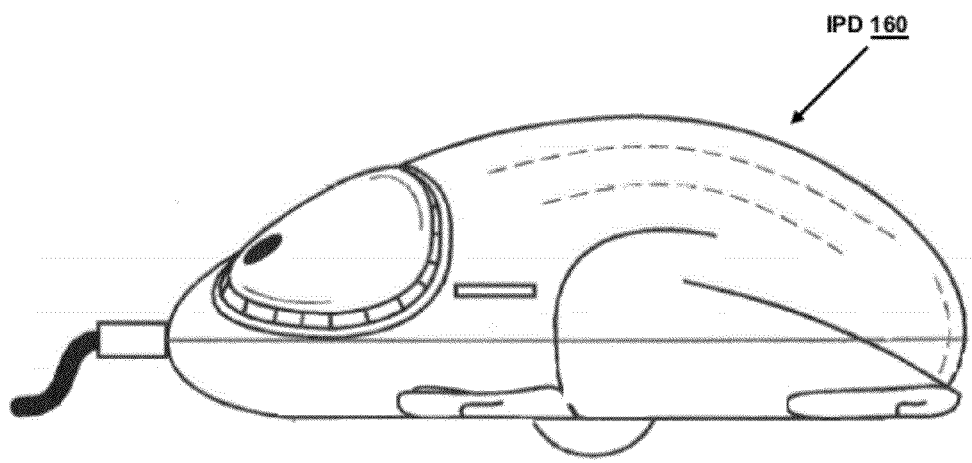
Figure 4C:
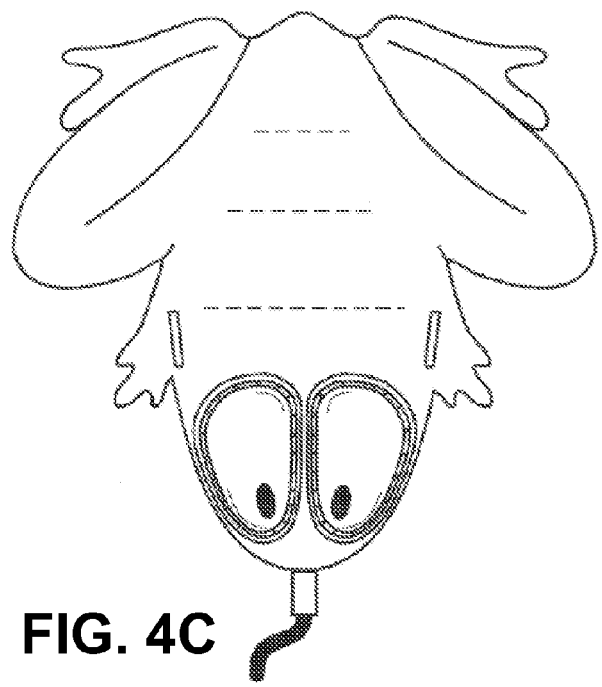
Figure 4E:
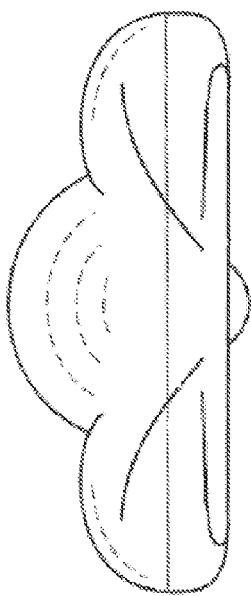
Figure 4D:
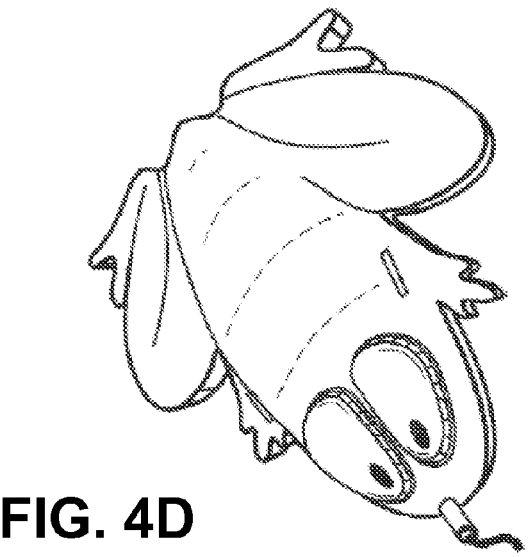
Figure 5:
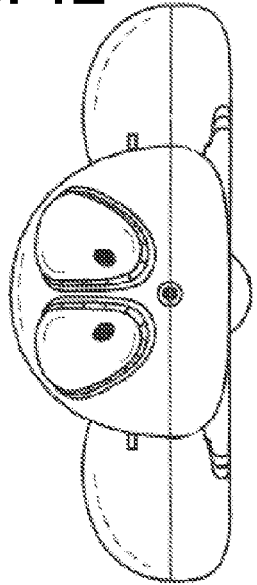

Turning now to FIG. 3, there is provided an illustration of the underside of the IPD 160, according to an embodiment. The underside of IPD 160 is equipped with Sensor Assembly 305 and Gliders 310a-n. Sensor Assembly 305 contains Sensor 185 (FIG. 1) and any additional parts needed to provide positional location tracking and movement tracking functionality for Sensor 185 (e.g., a mouse ball assembly). In another embodiment, Sensor Assembly 305 may also be removable and/or interchangeable. Removal of Sensor Assembly 305 may also provide service access to IPD 160.

Gliders 310a-n allow smoother movement and gliding of IPD 160 on a surface (e.g., themes surface 190 or a generic surface, such as a desk top). In one embodiment, Gliders 310a-n are raised low friction surfaces that provide low friction contact points with a surface on which IPD 160 is resting in order to improve gliding and decrease friction with the surface. In one embodiment, Gliders 310a-n may be plastic or metallic roller-spheres, partially exposed from the IPD 160 chassis for even further friction reduction with a surface.

Various other orientations and design features of example IPD 160 are provided by FIGS. 4A-4E and 5, including alternate design features of IPD 160 from multiple different angles. While these examples are all illustrations of a frog design, it is appreciated that other designs are supported in alternate embodiments, including without limitations use of a fish, insect, or other animal design (collectively referred to as "animal design" to simplify the description thereof). Also, as previously described, the actual shape of the IPD 160 can also vary to include shapes of mascots, avatars, and the like. Importantly, each different IPD design presents a different color and shape and associated interactive utility (which may be a videogame or screensaver) and surface design representing the habitat of that animal or other themed environment or motif that is in some way associated with the particular shape and or type of IPD. The combination of the IPD 160, themed surface 190, interactive user interface 127 or screen saver/shots (via interactive utility 118), and play back of audible sounds (or other types of feedback) presents a seamless visual effect of the IPD 160 being disposed within its true habitat both on the mouse pad (themed surface 190) on which the IPD rests and moves/glides and on the screen saver or interactive user interface that is visible on the display 125 of the computer 100.

Figure 6:
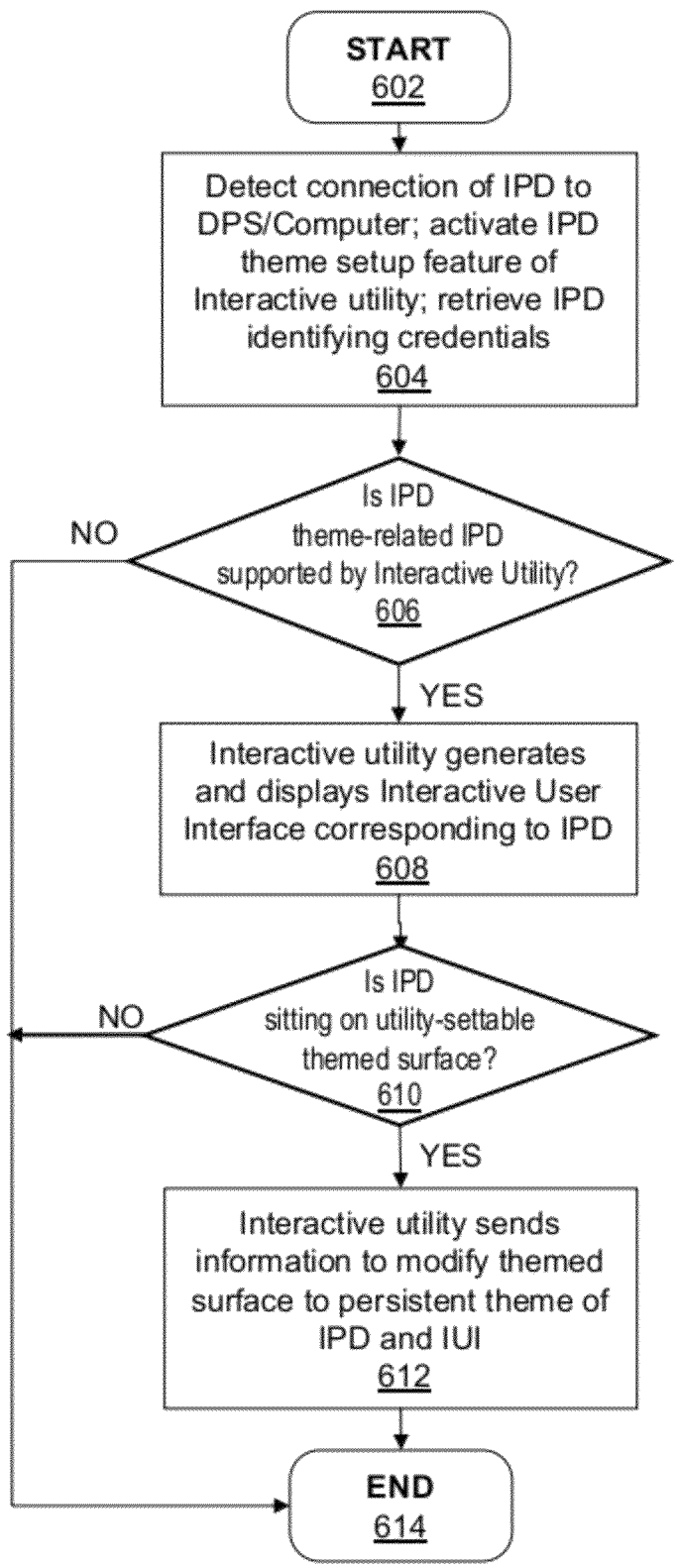
FIG. 6 is a high-level flow chart illustrating an example method of providing a data processing system environment with a persistent theme by matching a themed surface and an interactive user interface to a theme associated with a connected IPD, according to one or more embodiments.
Figure 7:
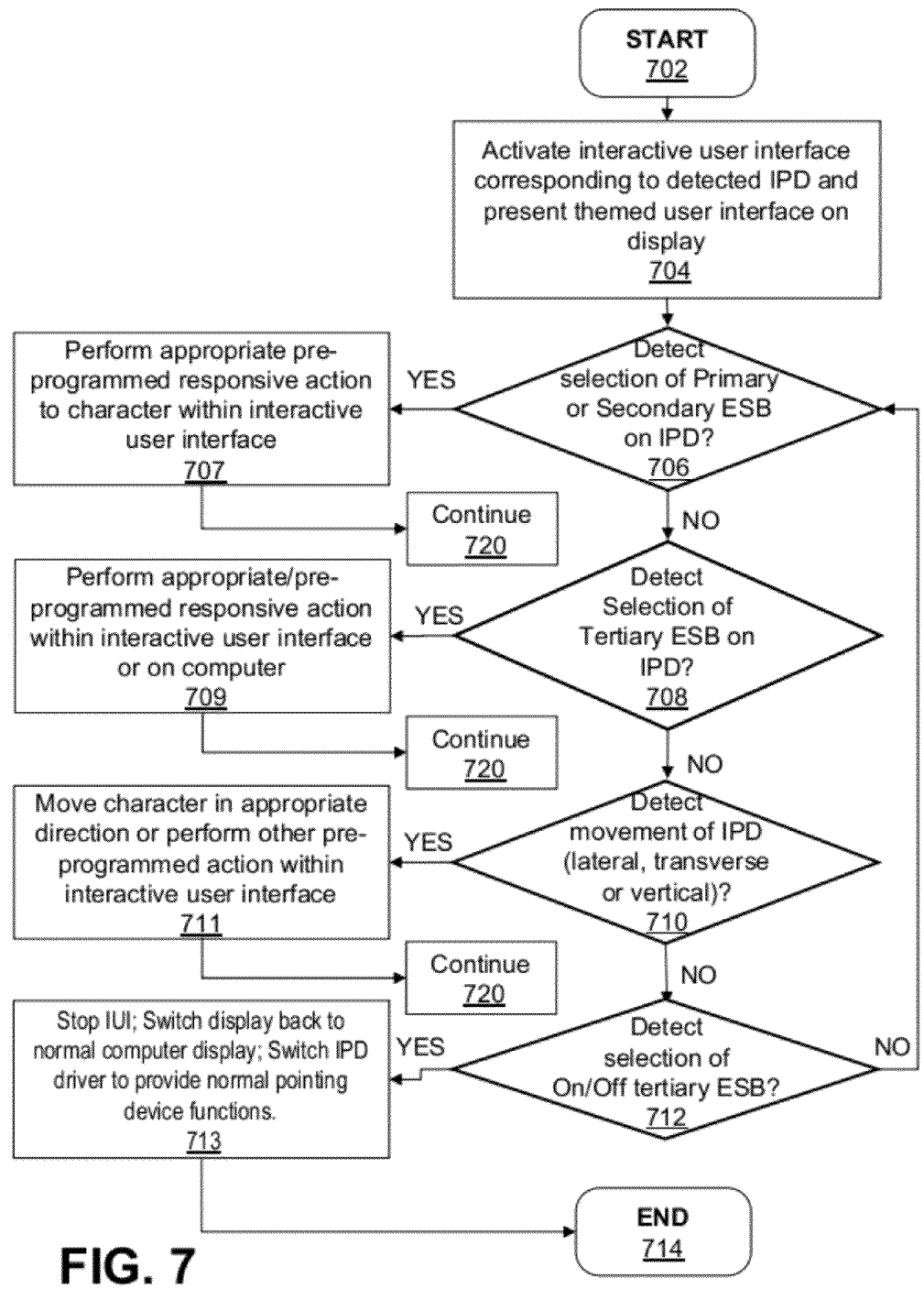
FIG. 7 is a high level flow chart illustrating an example method of setting up a data processing environment utilizing a combination of at least two of a themed computer skin, an interactive utility, an IPD, and a themed surface, according to one or more embodiments.

FIGS. 6 and 7 present flow charts of various methods performed in one or more embodiments according to the descriptions presented herein. Certain of the functional aspects of the methods are described herein as being performed by the interactive utility 118 and/or the pointing device driver 114, with the understanding that the both the interactive utility 118 and the pointing device driver 114 provide software and firmware components and the methods described are processor-executed processes whereby the processor of the computer executes portions of program code received/retrieved from the larger program modules (etc., interactive utility 118 and the pointing device driver 114) to produce an intended result.

Referring now to FIG. 6, a high-level flow-chart is presented illustrating aspects of a method for setting up a persistent theme in a computing environment. In one embodiment, the method implements a change from a current theme of a modifiable themed surface 198 and interactive user interface 127 to match a persistent theme of the connected IPD 160. After initiator block 602, an IPD device detecting module of IPD device driver 114 detects a connection of an IPD 160 to computer 102 and activates a theme setup feature of interactive utility 118 (block 604). IPD 160 may be connected wirelessly (via a connection of wireless transceiver 128 and wireless transceiver 196) or via a wired connection 155. In one embodiment, if pointing device driver 114 does not have the software required (e.g., the correct version of the interactive utility 118) to modify the user interface and surface, pointing device driver 114 can first download the persistent theme from an accessible storage location or via the internet, before initiating the steps to change the current themes to the persistent theme.

The interactive utility 118, executing on processor 105 of computer 102, retrieves certain identifying credentials of the IPD from IPD 160 or from device driver 114 of IPD 160. According to one embodiment, the IPD credentials provide information about the types of features available through and/or supported by the IPD and informs the interactive utility 118 whether the IPD supports a themed interface with the computer 102. The interactive utility 118 determines at block 606 whether the IPD 160 is associated with a particular theme that is supported by the interactive utility 118. If the IPD is a themed IPD and the particular theme is one that is supported by the interactive utility 118, the interactive utility generates and displays an interactive user interface (IUI) 127 corresponding to the theme supported by the IPD 160 (block 608).

Interactive utility 118 then determines at block 610 whether the surface on which IPD is operating (or currently laying on top of) is also a themed surface with one or more features that can be settable by the interactive utility 118 to set the surface to reflect the particular theme of the IPD and the IUI. Assuming the surface is settable by the utility, at block 612, Interface utility 118 transmits the necessary information to cause the surface to change in appearance and/or functionality to match that of the current persistent theme of the IPD 160 and/or the IUI 127 (block 612). The process then ends at block 620.

Referring now to FIG. 7, there is illustrated an example method by which the IPD is utilized within a persistent theme computer environment to manipulate and/or modify aspects of that themed environment, according to one embodiment. Following initiation block 702, the method proceeds to block 704 at which the interactive utility 118 (executing on the processor, causes the processor to) activates the interactive user interface 127 that corresponds to the detected IPD 160. The interactive utility displays the themed IUI on the computer display. The interactive utility next receives and/or detects one or more of a plurality of different inputs and/or selections from/on the IPD 160 and performs a pre-programmed function corresponding to the detected input/selection. At block 706, the interface utility 118 determines whether the detected input is of a selection of the primary or the secondary ESBs 180a-b. If the detected input is one of a selection of the primary or of the secondary ESB 180a-b, the interactive utility 118 performs the respective pre-programmed function that is appropriate within the themed environment, including manipulating the character (mascot, etc.) within the IUI on the computer display (block 707). The interactive utility 118 then continues to wait for additional inputs from the IPD or for a reversed input from the IUI that would trigger a sensory response at the IPD (block 720). For example, if the frog shaped character is made to jump into the water, the interactive utility may transmit a signal to the IPD 160 to cause the IPD to make a splashing sound or to vibrate or to light up the eyes of the IPD.

If, as determined at block 708, the detected input is one of a selection of a tertiary ESB 180c-n, the interactive utility 118 performs the respective pre-programmed function that is appropriate within the themed environment, including within the IUI on the computer display (block 709). The interactive utility then continues to wait for additional inputs. If, as determined at block 710, the detected input is a movement of the IPD 160, the interactive utility 118 performs the movement of the character within the IUI on the computer display (block 711). The interactive utility then continues to wait for additional inputs. It is appreciated, however, that a movement of the IPD can also be associated with some other function other than a corresponding movement of the on screen character. If, as determined at block 712, the detected input is the selection of a tertiary ESB 180c-n that has been designated as the on/off switch for displaying the themed IUI on the display screen, the interactive utility 118 stops the IUI, switches the display back to the normal computer display, and changes the IPD driver to provide normal pointing device functions that are not tied to the persistent theme of the computing environment (block 713). The process then terminates at end block 714.

Generally, the above descriptions of the various embodiments describe a computing system environment that comprises an improved pointing device (IPD) coupled to a computer having a computer display with an interactive user interface (IUI), all having a persistent theme and/or motif. The persistent theme is one that is based on and/or correlates to the aesthetic design of the IPD, which can be one of a plurality of distinct shapes of an animal, insect, mascot, among others, that can be associated with a particular persistent theme. The determined persistent theme is extended to the interactive utility and optionally to the surface on which the IPD rests and to the exterior casing or skin of the computer cover. The IPD has a plurality of Enhanced Selection Buttons (ESBs). When the IPD and computer are operating with a persistent theme, such as with the IUI operating as a screen saver, the ESBs can be configured to manipulate certain visual and other aspects of the IUI, including controlling a character within the IUI. The IPD may also be equipped with a speaker, light emitting diodes, and tactile mechanism for providing auditory, visual, and tactile responses responsive to user interaction and feedback from the IUI while the computer is on persistent theme mode.

In a specific example in which the theme is a collegiate sports team or with a theme being a professional sports team, the theme can involve the colors of the team, mascot of the team, the city in which the team plays, and/or and certain players on the team. Then, assuming the mascot is a tiger, the IPD 160 could be shaped as a tiger, with the eyes of the tiger prominently displayed as the primary and secondary ESBs 180a-b. Also, the skin of the laptop computer could be design of the teams colors and logo. The mouse pad or surface could then be the field of play (e.g., a soccer field for a soccer team). The interactive user interface (IUI) could then be another field with the team colors and a superimposed image of one or more prominent team players, when the IUI is in screen saver mode. When the IUI is switch to a video game mode, however, the IUI can display an active field with a ball that can be moved down the filed by movement of the IPD and selection of one or more of the ESBs 180. The true fan can therefore create an entire computing environment around his/her team, without giving up the functionality of an IPD that can be utilized as a regular IPD when the computer is being utilized for other normal computing purposes.

Thus, the various embodiments described herein provide an interactive computing environment having a persistent theme, comprising: a computing device having a processor, a display monitor, and an interactive utility that executes on the processor and generates an interactive user interface (IUI) with a first viewable theme displayed on the display monitor; a pointing device capable of being communicatively coupled to the computing device and comprising: a sensor that provides positional location tracking and movement tracking of the pointing device to the data processing system; a transceiver for sending data to and receiving from the computing device; and one or more enhanced selection buttons; and a themed surface having a specific visible theme and atop which the pointing device can be positioned and moved. Each of the IUI, the pointing device, and the themed surface share a same persistent theme.

In one embodiment, the interactive utility comprises program code that executes on the processor to generate an interactive video game that is controllable via the pointing device, and wherein the interactive video game shares the same persistent theme; and the pointing device comprises at least one selectable affordance that enables the interactive utility to toggle the computer device and the display monitor between a screen saver mode and a video gaming mode. The pointing device further comprises: one or more enhanced selection buttons; and a controller having an action set converter that coverts a single input of a specific enhanced selection button into an enhanced action that is transmitted to the computing device. In response to the computing device being in a screen saver mode or a video gaming mode when the enhanced action is received, the computing device enables the enhanced action to be performed within the IUI. An enhanced action comprises one or more of: a multiple button clicks; a click-and-hold; and a click-and-drag; and a vertical or lateral jump of a character within the IUI. Also, the IUI comprises a character disposed within a themed setting corresponding to the persistent theme and the character is manipulated by movement of the pointing device and selection of one or more enhanced selection buttons of the pointing device.

According to one embodiment, the persistent theme is one of a uniquely distinguishable theme related to one of: a collegiate or university institution; a habitat; a videogame; a motion picture; a television program; a sports team; a business; an advertising campaign; a healthcare institution; a business institution; and a political campaign.

One or more portions of the pointing device is designed in a likeness of one or more of a character, a mascot, a person, an animal and an object that is appropriate for maintaining the persistent theme. Also, at least two of the one or more enhanced selection buttons are in the shape of eyes and the eyes represent selectable affordances that enable the main selection functions of the pointing device when the computer device is in a normal operating mode and that provide enhanced features when the computer device is in one of a screen saver mode and a video game mode. In one aspect, at least two enhanced selection buttons are illuminated responsive to depressing or releasing of the at least two enhanced selection buttons. In another aspect, the at least two enhanced selection buttons are illuminated responsive to receiving one or more signal cues from the interactive utility. In yet another aspect, at least two enhanced selection buttons (EHBs) comprise light emitting diodes that enable the at least two enhanced selection buttons to be illuminated following one or more triggers from among: a detected depression of one of the at least two EHBs; and a feedback response from the interactive utility related to an activity occurring within the IUI.

In one embodiment, the pointing device has one or more feedback mechanisms from among an internal speaker for playing back one or more sound clips and a tactile response mechanism, wherein the pointing device emits an audio output of the one or more sound clips and/or vibrates responsive to one or more of: a detection of a depression or a release of one or more of the one or more enhanced selection buttons; receiving one or more signal cues from the interactive utility; detecting a specific movement of the pointing device relative to the themed surface; and identifying a particular activity occurring within the IUI when in one of the screen saver mode and the video gaming mode; wherein the one or more sound clips are appropriate for the persistent theme. The interactive utility comprises program code for representing the pointing device as a character within the IUI and enabling the character to be manipulated via inputs received from the pointing device.

In one embodiment, the computer device is a laptop device and the computing environment further comprises a physical skin that is placed over at least one surface of the laptop as a cover, wherein the physical skin is designed with the same persistent theme.

In one embodiment, the pointing device has stored therein at least one identifying credentials that can be utilized by the interactive utility to identify a theme to which the pointing device corresponds and wherein, in response to detecting a connection of the pointing device to the computer device and receiving the identifying credential of the pointing device, the interactive utility selects at least one of a corresponding themed screen saver and a corresponding themed video game that corresponds to the theme of the pointing device to enable the IUI and the pointing device to share the same persistent theme.

In one embodiment, the themed surface has a display and a receiver that connects to one of the computer device and the pointing device, and responsive to receipt from one of the computer device and the pointing device of specific theme data, the themed surface modified a visual appearance of the display to correspond to the same persistent theme as the IUI and the pointing device. Thus, one aspect provides a themed computer skin for fixably attaching to an external surface of a computer system to provide a specific visual appearance of the computer system that corresponds to a theme of a pointing device being utilized with the computer system.

Aspects of the described embodiments provide a pointing device comprising: a transceiver for communicatively connecting the pointing device to a data processing system and for sending data to and receiving from the data processing system; a sensor that provides positional location tracking and movement tracking of the pointing device when the pointing device is communicatively connected to the data processing system; and a plurality of selectable affordances including one or more enhanced selection buttons. The pointing device further comprises: a controller having an action set converter that coverts a single input of a specific enhanced selection button into an enhanced action that is transmitted to the data processing system; and at least one selectable affordance that enables the toggling of an interactive utility executing on the data processing system between a screen saver mode and a video gaming mode; In response to the computing device being in a screen saver mode or a video gaming mode when the enhanced action is received, the computing device enables the enhanced action to be performed within an interactive user interface of the interactive utility. Also, the enhanced action comprises one or more of: a multiple button clicks; a click-and-hold; and a click-and-drag; and a vertical or lateral jump of a character within the IUI.

In one embodiment, one or more portions of the pointing device is designed in a likeness of one or more of a character, a mascot, a person, an animal and an object that is appropriate for maintaining a persistent theme. The IUI comprises a character disposed within a themed setting corresponding to a persistent theme and the character is manipulated by movement of the pointing device and selection of one or more enhanced selection buttons of the pointing device. Further, at least two of the one or more enhanced selection buttons are in the shape of eyes and wherein the eyes represent selectable affordances that enable the main selection functions of the pointing device when the data processing system is in a normal operating mode and that provide enhanced features when the data processing system is in one of a screen saver mode and a video game mode.

Also, in one embodiment, at least two enhanced selection buttons can be illuminated responsive to depressing or releasing of the at least two enhanced selection buttons. Also, at least two enhanced selection buttons can be illuminated responsive to receiving one or more signal cues from the interactive utility. The at least two enhanced selection buttons (EHBs) comprise light emitting diodes that enable the at least two enhanced selection buttons to be illuminated following one or more triggers from among: a detected depression of one of the at least two EHBs; and a feedback response from the interactive utility related to an activity occurring within the IUI.

In one embodiment, the pointing device has one or more feedback mechanisms from among an internal speaker for playing back one or more sound clips and a tactile response mechanism, wherein the pointing device emits an audio output of the one or more sound clips and/or vibrates responsive to one or more of: a detection of a depression or a release of one or more of the one or more enhanced selection buttons; receiving one or more signal cues from the interactive utility; detecting a specific movement of the pointing device relative to the themed surface; and identifying a particular activity occurring within the IUI when in one of the screen saver mode and the video gaming mode; wherein the one or more sound clips are appropriate for the persistent theme.

Further, the pointing device comprises a persistent storage having stored therein at least one identifying credentials that can be utilized by the interactive utility to identify a theme to which the pointing device corresponds and where, in response to detecting a connection of the pointing device to the computer device and receiving the identifying credential of the pointing device, the interactive utility selects at least one of a corresponding themed screen saver and a corresponding themed video game that corresponds to the theme of the pointing device to enable the IUI and the pointing device to share the same persistent theme.

Additional aspects of the described embodiments provide a method for enabling a persistent themed computing environment, the method comprising: detecting a coupling of a pointing device to a computer system; receiving an identifying credential associated with the pointing device, wherein the received identifying credential comprises information indicating the pointing device comprises one or more enhanced selection buttons and is designed with a particular theme; identifying the particular theme of the pointing device from among available theme supported on the computer system; generating on a display monitor of the computer system an interactive user interface (IUI) having the same particular theme; receiving from the pointing device one or more selections via the one or more enhanced selection buttons; and modifying a display within the IUI based on the selections received from the pointing device.

In various embodiments, the method further comprises: in response to receipt of a first selection among the one or more selections automatically toggling the IUI between a screen saver mode and a video gaming mode; in response to receipt of a second selection among the one or more selections automatically displaying one or more actions associated with a character within the IUI to correspond to a detected action of the pointing device; and in response to receipt of a third selection among the one or more selections automatically toggling the IUI back to a normal screen for normal operations of the computer system.

While the disclosure has been particularly shown and described with reference to described embodiments, it will be understood by those skilled in the art that various changes in form and detail may be made therein without departing from the spirit and scope of the disclosure. Thus, it is appreciated that various other functions can be provided within a themed computing environment. These functions can be pre-programmed within the interactive utility, or added as updates to the interactive utility 118, perhaps based on user selection and or purchase. The present disclosure is in no way limited to those exemplary features and functions presented in the described embodiments.

The block diagrams in the various figures presented and described herein illustrate the architecture, functionality, and operation of possible implementations of systems, methods and computer program products according to various embodiments of the present invention. In this regard, each block in the block diagrams may represent a module, segment, or portion of code, which comprises one or more executable instructions for implementing the specified logical function(s). It will also be noted that each block of the block diagrams, and combinations of blocks in the block diagrams, can be implemented by special purpose hardware-based systems that perform the specified functions or acts, or combinations of special purpose hardware and computer instructions.

As will be appreciated by one skilled in the art, aspects of the present invention may be embodied as a system, method or computer program product. Accordingly, aspects of the present invention may take the form of an entirely hardware embodiment, an entirely software embodiment (including firmware, resident software, micro-code, etc.) or an embodiment combining software and hardware aspects that may all generally be referred to herein as a "circuit," "module" or "system." Furthermore, aspects of the present invention may take the form of a computer program product embodied in one or more computer readable medium(s) having computer readable program code embodied thereon.

Any combination of one or more computer readable medium(s) may be utilized. The computer readable medium may be a computer readable signal medium or a computer readable storage medium. A computer readable storage medium may be, for example, but not limited to, an electronic, magnetic, optical, electromagnetic, infrared, or semiconductor system, apparatus, or device, or any suitable combination of the foregoing. More specific examples (a non-exhaustive list) of the computer readable storage medium would include the following: an electrical connection having one or more wires, a portable computer diskette, a hard disk, a random access memory (RAM), a read-only memory (ROM), an erasable programmable read-only memory (EPROM or Flash memory), a portable compact disc read-only memory (CD-ROM), an optical storage device, a magnetic storage device, or any suitable combination of the foregoing. In the context of this document, a computer readable storage medium may be any tangible medium that can contain, or store a program for use by or in connection with an instruction execution system, apparatus, or device.

A computer readable signal medium may include a propagated data signal with computer readable program code embodied therein, for example, in baseband or as part of a carrier wave. Such a propagated signal may take any of a variety of forms, including, but not limited to, electro-magnetic, optical, or any suitable combination thereof. A computer readable signal medium may be any computer readable medium that is not a computer readable storage medium and that can communicate, propagate, or transport a program for use by or in connection with an instruction execution system, apparatus, or device.

Program code embodied on a computer readable medium may be transmitted using any appropriate medium, including but not limited to wireless, wireline, optical fiber cable, R.F, etc., or any suitable combination of the foregoing. Computer program code for carrying out operations for aspects of the present invention may be written in any combination of one or more programming languages, including an object oriented programming language such as Java, Smalltalk, C++ or the like and conventional procedural programming languages, such as the "C" programming language or similar programming languages. The program code may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider).

Aspects of the present invention are described below with reference to block diagrams of methods, apparatus (systems) and computer program products according to embodiments of the invention. It will be understood that each block of block diagrams, and combinations of blocks in the block diagrams, can be implemented by computer program instructions. These computer program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks.

These computer program instructions may also be stored in a computer readable medium that can direct a computer, other programmable data processing apparatus, or other devices to function in a particular manner, such that the instructions stored in the computer readable medium produce an article of manufacture including instructions which implement the function/act specified in the flowchart and/or block diagram block or blocks. The computer program instructions may also be loaded onto a computer, other programmable data processing apparatus, or other devices to cause a series of operational steps to be performed on the computer, other programmable apparatus or other devices to produce a computer implemented process such that the instructions which execute on the computer or other programmable apparatus provide processes for implementing the functions/acts specified in the block diagrams.

As will be further appreciated, the processes in embodiments of the present invention may be implemented using any combination of software, firmware or hardware. As a preparatory step to practicing the invention in software, the programming code (whether software or firmware) will typically be stored in one or more machine readable storage mediums such as fixed (hard) drives, diskettes, optical disks, magnetic tape, semiconductor memories such as ROMs, PROMs, etc., thereby making an article of manufacture in accordance with the invention. The article of manufacture containing the programming code is used by either executing the code directly from the storage device, by copying the code from the storage device into another storage device such as a hard disk, RAM, etc., or by transmitting the code for remote execution using transmission type media such as digital and analog communication links. The methods of the invention may be practiced by combining one or more machine-readable storage devices containing the code according to the present invention with appropriate processing hardware to execute the code contained therein. An apparatus for practicing the invention could be one or more processing devices and storage systems containing or having network access to program(s) coded in accordance with the invention.

Thus, it is important that while an illustrative embodiment of the present invention is described in the context of a fully functional computer system with installed (or executed) software, those skilled in the art will appreciate that the software aspects of an illustrative embodiment of the present invention are capable of being distributed as a program product in a variety of forms, and that an illustrative embodiment of the present invention applies equally regardless of the particular type of media used to actually carry out the distribution.

While the invention has been described with reference to exemplary embodiments, it will be understood by those skilled in the art that various changes may be made and equivalents may be substituted for elements thereof without departing from the scope of the invention. In addition, many modifications may be made to adapt a particular system, device or component thereof to the teachings of the invention without departing from the essential scope thereof. Moreover, the use of the terms first, second, etc. do not denote any order or importance, but rather the terms first, second, etc. are used to distinguish one element from another.

The terminology used herein is for the purpose of describing particular embodiments only and is not intended to be limiting of the invention. As used herein, the singular forms "a", "an" and "the" are intended to include the plural forms as well, unless the context clearly indicates otherwise. It will be further understood that the terms "comprises" and/or "comprising," when used in this specification, specify the presence of stated features, integers, steps, operations, elements, and/or components, but do not preclude the presence or addition of one or more other features, integers, steps, operations, elements, components, and/or groups thereof.

The corresponding structures, materials, acts, and equivalents of all means or step plus function elements in the claims below are intended to include any structure, material, or act for performing the function in combination with other claimed elements as specifically claimed. The description of the present invention has been presented for purposes of illustration and description, but is not intended to be exhaustive or limited to the invention in the form disclosed. Many modifications and variations will be apparent to those of ordinary skill in the art without departing from the scope and spirit of the invention. The embodiment was chosen and described in order to best explain the principles of the invention and the practical application, and to enable others of ordinary skill in the art to understand the invention for various embodiments with various modifications as are suited to the particular use contemplated.

What is claimed is:

1. An interactive computing environment having a persistent theme, comprising:
   a computing device having a processor, a display, and an interactive utility that executes on the processor and generates an interactive user interface (IUI) with a first viewable theme displayed on the display;
   a pointing device capable of being communicatively coupled to the computing device and comprising:
   a sensor that provides positional location tracking and movement tracking of the pointing device to the data processing system;
   a transceiver for sending data to and receiving from the computing device; and
   one or more enhanced selection buttons;
   an internal speaker for emitting an audio output, wherein the audio output comprises a plurality of sound clips, and wherein the plurality of sound clips comprise one or more sound clips emitted from the pointing device in response to the pointing device detecting a specific movement of the pointing device relative to a themed surface that has a specific visible theme and atop which the pointing device can be positioned and moved;
a controller having an action set converter that converts a single input of a specific enhanced selection button into an enhanced action that is transmitted to the data processing system, wherein the enhanced action is multiple button clicks of the specific enhanced selection button
at least one selectable affordance that enables the toggling of an interactive utility executing on the data processing system between a screen saver mode and a video gaming mode;
wherein in response to the computing device being in a screen saver mode or a video gaming mode when the enhanced action is received, the computing device enables the enhanced action to be performed within an interactive user interface of the interactive utility;
wherein the enhanced action comprises one or more of: a click-and-hold, and a click-and-drag, and a vertical or lateral jump of a character within an interactive user interface (IUI) of the data processing system;
wherein one or more portions of the pointing device is designed in a likeness of one or more of a character, a mascot, a person, an animal and an object that is appropriate for maintaining a persistent theme; and
wherein the IUI comprises a character disposed within a themed setting corresponding to a persistent theme and the character is manipulated by movement of the pointing device and selection of one or more enhanced selection buttons of the pointing device:
wherein each of the IUI, the pointing device, and the themed surface share a same persistent theme; and
wherein the plurality of sound clips are associated with the persistent theme.

2. The interactive computing environment of claim 1, wherein:
the interactive utility comprises program code that executes on the processor to generate an interactive video game that is controllable via the pointing device, and wherein the interactive video game shares the same persistent theme; and
the pointing device comprises at least one selectable affordance that enables the interactive utility to toggle the computer device and the display between a screen saver mode and a video gaming mode.

3. The interactive computing environment of claim 1, wherein the pointing device further comprises:
one or more enhanced selection buttons;
a controller having an action set converter that coverts a single input of a specific enhanced selection button into an enhanced action that is transmitted to the computing device, wherein the enhanced action is multiple button clicks of the specific enhanced selection button;
wherein in response to the computing device being in a screen saver mode or a video gaming mode when the enhanced action is received, the computing device enables the enhanced action to be performed within the IUI.

4. The interactive computing environment of claim 3, wherein the IUI comprises a character disposed within a themed setting corresponding to the persistent theme and the character is manipulated by movement of the pointing device and selection of one or more enhanced selection buttons of the pointing device.

5. The interactive computing environment of claim 1, wherein the pointing device further comprises:
one or more enhanced selection buttons;
a controller having an action set converter that coverts a single input of a specific enhanced selection button into an enhanced action that is transmitted to the computing device, wherein the enhanced action comprises one or more of: a click-and-hold, and a click-and-drag, and a vertical or lateral jump of a character within the IUI.

6. The interactive computing environment of claim 1, wherein the persistent theme is one of a uniquely distinguishable theme related to one of: a collegiate or university institution; a habitat; a videogame; a motion picture; a television program; a sports team; a business; an advertising campaign; a healthcare institution; a business institution; and a political campaign.

7. The interactive computing environment of claim 1, wherein one or more portions of the pointing device is designed in a likeness of one or more of a character, a mascot, a person, an animal and an object that is appropriate for maintaining the persistent theme.

8. The interactive computing environment of claim 7, wherein at least two enhanced selection buttons of the one or more enhanced selection buttons are in the shape of eyes and wherein the eyes represent selectable affordances that enable the main selection functions of the pointing device when the computer device is in a normal operating mode and that provide enhanced features when the computer device is in one of a screen saver mode and a video game mode.

9. The interactive computing environment of claim 8, wherein the at least two enhanced selection buttons are illuminated responsive to depressing or releasing of the at least two enhanced selection buttons.

10. The interactive computing environment of claim 8, wherein the at least two enhanced selection buttons are illuminated responsive to receiving one or more signal cues from the interactive utility.

11. The interactive computing environment of claim 8, wherein the at least two enhanced selection buttons comprise light emitting diodes that enable the at least two enhanced selection buttons to be illuminated following one or more triggers from among: a detected depression of one of the at least two enhanced selection buttons; and a feedback response from the interactive utility related to an activity occurring within the IUI.

12. The interactive computing environment of claim 1, wherein the audio output further comprises one or more additional sound clips that are emitted via the internal speaker responsive to one or more of:
a detection of a depression or a release of one or more of the one or more enhanced selection buttons;
receiving one or more signal cues from the interactive utility;
identifying a particular activity occurring within the IUI when the computing device is in one of a screen saver mode and a video gaming mode; and
the one or more additional sound clips are appropriate for the persistent theme.

13. The interactive computing environment of claim 1, wherein further the interactive utility comprises program code for representing the pointing device as a character within the IUI and enabling the character to be manipulated via inputs received from the pointing device.

14. The interactive computing environment of claim 1, wherein the themed surface is a mouse pad.

15. The interactive computing environment of claim 1, wherein the computer device is a laptop device and the computing environment further comprises a physical skin that is placed over at least one surface of the laptop as a cover, wherein the physical skin is designed with the same persistent theme.

16. The interactive computing environment of claim 1, wherein:
the pointing device further comprises a tactile response mechanism that provides a vibrational feedback responsive to receiving a signal cue from the interactive utility;
the pointing device emits vibrates via the tactile response mechanism responsive to one or more of:
a detection of a depression or a release of one or more of the one or more enhanced selection buttons;
receiving one or more signal cues from the interactive utility;
detecting a specific movement of the pointing device relative to the themed surface; and
identifying a particular activity occurring within the IUI when in one of the screen saver mode and the video gaming mode; and
the one or more sound clips are appropriate for the persistent theme.

17. The interactive computing environment of claim 1, wherein:
the pointing device has stored therein at least one identifying credential that can be utilized by the interactive utility to identify a theme to which the pointing device corresponds;
the at least one identifying credential provides information on one or more types of features that are available and supported by the pointing device and provides an indication whether the pointing device supports a themed interface; and
the interactive utility comprises program code that in response to detecting a connection of the pointing device to the computer device and receiving the identifying credential from the pointing device, selects at least one of a corresponding themed screen saver and a corresponding themed video game that corresponds to the theme of the pointing device to enable the IUI and the pointing device to share the same persistent theme.

18. The interactive computing environment of claim 1, wherein the themed surface has a display and a receiver that connects to one of the computer device and the pointing device, and responsive to receipt from one of the computer device and the pointing device of specific theme data, the themed surface modified a visual appearance of the display to correspond to the same persistent theme as the IUI and the pointing device.

19. The interactive computing environment of claim 1, further comprising a themed computer skin that attaches to an external surface of the computing device to provide a specific visual appearance of the computer system that corresponds to the persistent theme.

20. A pointing device comprising:
a transceiver for communicatively connecting the pointing device to a data processing system and for sending data to and receiving from the data processing system;
a sensor that provides positional location tracking and movement tracking of the pointing device when the pointing device is communicatively connected to the data processing system;
a plurality of selectable affordances including one or more enhanced selection buttons;
an internal speaker for emitting an audio output, wherein the audio output comprises a plurality of sound clips, wherein the plurality of sound clips comprise one or more sound clips emitted from the pointing device in response to the pointing device detecting a specific movement of the pointing device relative to a themed surface, and wherein the plurality of sound clips are associated with the persistent theme;
a controller having an action set converter that converts a single input of a specific enhanced selection button into an enhanced action that is transmitted to the data processing system, wherein the enhanced action is multiple button clicks of the specific enhanced selection button
at least one selectable affordance that enables the toggling of an interactive utility executing on the data processing system between a screen saver mode and a video gaming mode;
wherein in response to the computing device being in a screen saver mode or a video gaming mode when the enhanced action is received, the computing device enables the enhanced action to be performed within an interactive user interface of the interactive utility;
wherein the enhanced action comprises one or more of: a click-and-hold, and a click-and-drag, and a vertical or lateral jump of a character within an interactive user interface (IUI) of the data processing system;
one or more portions of the pointing device is designed in a likeness of one or more of a character, a mascot, a person, an animal and an object that is appropriate for maintaining a persistent theme; and
wherein the IUI comprises a character disposed within a themed setting corresponding to a persistent theme and the character is manipulated by movement of the pointing device and selection of one or more enhanced selection buttons of the pointing device.

21. The pointing device of claim 20, further comprising:
a controller having an action set converter that coverts a single input of a specific enhanced selection button into an enhanced action that is transmitted to the data processing system, wherein the enhanced action is multiple button clicks of the specific enhanced selection button;
at least one selectable affordance that enables the toggling of an interactive utility executing on the data processing system between a screen saver mode and a video gaming mode;
wherein in response to the computing device being in a screen saver mode or a video gaming mode when the enhanced action is received, the computing device enables the enhanced action to be performed within an interactive user interface of the interactive utility;
one or more portions of the pointing device is designed in a likeness of one or more of a character, a mascot, a person, an animal and an object that is appropriate for maintaining a persistent theme; and
wherein the IUI comprises a character disposed within a themed setting corresponding to a persistent theme and the character is manipulated by movement of the pointing device and selection of one or more enhanced selection buttons of the pointing device.

22. The pointing device of claim 20, wherein at least two enhanced selection buttons of the one or more enhanced selection buttons are in the shape of eyes and wherein the eyes represent selectable affordances that enable the main selection functions of the pointing device when the data processing system is in a normal operating mode and that provide enhanced features when the data processing system is in one of a screen saver mode and a video game mode.

23. The pointing device of claim 20, wherein the at least two enhanced selection buttons of the one or more enhanced selection buttons are illuminated responsive to depressing or releasing of the at least two enhanced selection buttons.

24. The pointing device of claim 20, wherein:
the pointing device further comprises a tactile response mechanism that provides a vibrational feedback responsive to receiving a signal cue from an interactive utility of the data processing system;
the pointing device emits vibrates via the tactile response mechanism responsive to one or more of:
a detection of a depression or a release of one or more of the one or more enhanced selection buttons;
receiving one or more signal cues from the interactive utility;
detecting a specific movement of the pointing device relative to the themed surface; and
identifying a particular activity occurring within the IUI when in one of the screen saver mode and the video gaming mode;
the one or more sound clips are appropriate for the persistent theme; and
the at least two enhanced selection buttons of the one or more enhanced selection buttons are illuminated responsive to receiving one or more signal cues from the interactive utility.

25. The pointing device of claim 20, wherein the at least two enhanced selection buttons of the one or more enhanced selection buttons comprise light emitting diodes that enable the at least two enhanced selection buttons to be illuminated following one or more triggers from among: a detected depression of one of the at least two enhanced selection buttons; and a feedback response from the interactive utility related to an activity occurring within the IUI.

26. The pointing device of claim 20, wherein the audio output further comprises one or more additional sound clips that are emitted via the internal speaker responsive to one or more of:
a detection of a depression or a release of one or more of the one or more enhanced selection buttons;
receiving one or more signal cues from the interactive utility;
identifying a particular activity occurring within the IUI when the computing device is in one of the screen saver mode and the video gaming mode; and
the one or more additional sound clips are appropriate for the persistent theme.

27. The pointing device of claim 20, further comprising:
a persistent storage having stored therein at least one identifying credential that can be utilized by the interactive utility to identify a theme to which the pointing device corresponds;
the at least one identifying credential provides information on one or more types of features that are available and supported by the pointing device and provides an indication whether the pointing device supports a themed interface; and
wherein, in response to detecting a connection of the pointing device to the data processing system and the data processing system receiving the identifying credential of the pointing device, an interactive utility of the data processing system selects at least one of a corresponding themed screen saver and a corresponding themed video game that corresponds to the theme of the pointing device to enable an interactive user interface (IUI) executing on the data processing system and the pointing device to share the same persistent theme.

28. A method for enabling a persistent themed computing environment, the method comprising:

detecting a coupling of a pointing device to a computer system;
receiving an identifying credential associated with the pointing device, wherein the received identifying credential comprises information indicating the pointing device comprises one or more enhanced selection buttons and is designed with a particular theme, wherein the pointing device comprises:
an internal speaker for emitting an audio output, wherein the audio output comprises a plurality of sound clips, and wherein the plurality of sound clips comprise one or more sound clips emitted from the pointing device in response to the pointing device detecting a specific movement of the pointing device relative to a themed surface having a specific visible theme and atop which the pointing device can be positioned and moved; and
a controller having an action set converter that converts a single input of a specific enhanced selection button into an enhanced action that is transmitted to the data processing system, wherein the enhanced action is multiple button clicks of the specific enhanced selection button; and
at least one selectable affordance that enables the toggling of an interactive utility executing on the data processing system between a screen saver mode and a video gaming mode;
wherein in response to the computing device being in a screen saver mode or a video gaming mode when the enhanced action is received, the computing device enables the enhanced action to be performed within an interactive user interface of the interactive utility;
wherein the enhanced action comprises one or more of: a click-and-hold, and a click-and-drag, and a vertical or lateral jump of a character within an interactive user interface (IUI) of the data processing system;
wherein one or more portions of the pointing device is designed in a likeness of one or more of a character, a mascot, a person, an animal and an object that is appropriate for maintaining a persistent theme; and
wherein the IUI comprises a character disposed within a themed setting corresponding to a persistent theme and the character is manipulated by movement of the pointing device and selection of one or more enhanced selection buttons of the pointing device;
identifying the particular theme of the pointing device from among available themes supported on the computer system;
generating, on a display of the computer system, an interactive user interface (IUI) having the same particular theme;
receiving, from the pointing device, one or more selections via the one or more enhanced selection buttons; and
modifying a an interactive user interface (IUI) of the computer system based on the selections received from the pointing device.

29. The method of claim 28, further comprising:
in response to receipt of a first selection among the one or more selections automatically toggling the IUI between a screen saver mode and a video gaming mode;
in response to receipt of a second selection among the one or more selections automatically displaying one or more actions associated with a character within the IUI to correspond to a detected action of the pointing device; and in response to receipt of a third selection among the one or more selections automatically toggling the IUI back to a normal screen for normal operations of the computer system.

* * * * *